(12) United States Patent
Chen et al.

(10) Patent No.: US 6,911,768 B2
(45) Date of Patent: Jun. 28, 2005

(54) TUNNELING EMITTER WITH NANOHOLE OPENINGS

(75) Inventors: Zhizhang Chen, Corvallis, OR (US); Sriram Ramamoorthi, Corvallis, OR (US); Hung Liao, Corvallis, OR (US); Paul Benning, Corvallis, OR (US); Alexander Govyadinov, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/263,055

(22) Filed: Oct. 1, 2002

(65) Prior Publication Data

US 2003/0089900 A1 May 15, 2003
US 2005/0110001 A9 May 15, 2003

Related U.S. Application Data

(63) Continuation-in-part of application No. 09/846,127, filed on Apr. 30, 2001, now Pat. No. 6,781,146, and a continuation-in-part of application No. 09/846,047, filed on Apr. 30, 2001, now Pat. No. 6,753,544.

(51) Int. Cl.[7] .............................................. H01J 1/312
(52) U.S. Cl. ........................ 313/391; 313/309; 313/336
(58) Field of Search .................. 313/308–311, 495–499, 313/336, 346, 351, 446–447, 391; 257/10; 445/24–25, 50–51

(56) References Cited

U.S. PATENT DOCUMENTS

| 3,665,241 A | 5/1972 | Spindt et al. |
| 3,760,216 A | * 9/1973 | Lasser et al. ........ 313/103 CM |
| 4,303,930 A | 12/1981 | VanGorkom et al. |

(Continued)

OTHER PUBLICATIONS

"Joyo Engineering: Printing Machines for LCD Manufacturing", www.crystec.com/joyprie, 5 pages.
Kusunoki, T., et al. "Increasing Emission Current from MIM Cathodes by Using an Ir–Pt–Au Multilayer Top Elecrode." IEEE Transactions on Electron Devices, vol. 47, No. 8, Aug. 2000, 1667–1672.
Eastman, P.C., et al. "Injection Electroluminescence in Metal—Semiconductor Tunnel Diodes." Solid–State Electronics, Pergamon Press 1964. vol. 7, pp. 879–885.

*Primary Examiner*—Joseph Williams
*Assistant Examiner*—Dalei Dong
(74) *Attorney, Agent, or Firm*—Timothy F Myers

(57) ABSTRACT

An emitter has an electron supply and a porous cathode layer having nanohole openings. The emitter also has a tunneling layer disposed between the electron supply and the cathode layer.

54 Claims, 16 Drawing Sheets

U.S. PATENT DOCUMENTS

| | | | |
|---|---|---|---|
| 4,516,146 A | | 5/1985 | Shannon et al. |
| 5,090,932 A | | 2/1992 | Dieumegard et al. |
| 5,414,272 A | | 5/1995 | Watanabe et al. |
| 5,453,661 A | * | 9/1995 | Auciello et al. ............... 315/1 |
| 5,473,218 A | | 12/1995 | Moyer |
| 5,554,859 A | | 9/1996 | Tsukamoto et al. |
| 5,557,596 A | | 9/1996 | Gibson et al. |
| 5,559,342 A | | 9/1996 | Tsukamoto et al. |
| 5,696,385 A | * | 12/1997 | Song et al. .................... 257/10 |
| 5,702,281 A | | 12/1997 | Huang et al. |
| 5,703,380 A | | 12/1997 | Potter |
| 5,726,524 A | * | 3/1998 | Debe ......................... 313/309 |
| 5,760,417 A | * | 6/1998 | Watanabe et al. ............. 257/11 |
| 5,763,997 A | * | 6/1998 | Kumar ....................... 313/495 |
| 5,814,832 A | | 9/1998 | Takeda et al. |
| 5,825,049 A | | 10/1998 | Simmons et al. |
| 5,837,331 A | * | 11/1998 | Menu et al. ................. 427/569 |
| 5,874,802 A | * | 2/1999 | Choi et al. .................. 313/495 |
| 5,969,473 A | * | 10/1999 | Huang et al. ............... 313/495 |
| 5,982,091 A | | 11/1999 | Konishi |
| 5,984,752 A | * | 11/1999 | Tanaka et al. ................ 445/51 |
| 6,008,576 A | | 12/1999 | Nakatani et al. |
| 6,011,356 A | | 1/2000 | Janning et al. |
| 6,023,124 A | | 2/2000 | Chuman et al. |
| 6,034,479 A | | 3/2000 | Xia |
| 6,064,149 A | * | 5/2000 | Raina ......................... 313/497 |
| 6,096,570 A | | 8/2000 | Hattori |
| 6,097,138 A | * | 8/2000 | Nakamoto .................. 313/309 |
| 6,107,732 A | | 8/2000 | Tolt |
| 6,118,136 A | | 9/2000 | Liu et al. |
| 6,137,212 A | | 10/2000 | Liu et al. |
| 6,166,487 A | * | 12/2000 | Negishi et al. ............. 313/495 |
| 6,181,055 B1 | * | 1/2001 | Patterson et al. ........... 313/310 |
| 6,229,258 B1 | * | 5/2001 | Xia ............................ 313/495 |
| 6,239,547 B1 | * | 5/2001 | Uemura et al. ............. 313/495 |
| 6,249,080 B1 | * | 6/2001 | Komoda et al. ............ 313/310 |
| 6,329,745 B2 | * | 12/2001 | Patterson et al. ........... 313/310 |
| 6,353,286 B1 | | 3/2002 | Talin et al. |
| 6,369,496 B1 | | 4/2002 | Yoshiki |
| 6,400,070 B1 | * | 6/2002 | Yamada et al. ............. 313/310 |
| 6,407,516 B1 | * | 6/2002 | Victor ........................ 315/365 |
| 6,445,124 B1 | * | 9/2002 | Asai et al. .................. 313/495 |
| 6,469,425 B1 | * | 10/2002 | Sakai et al. ................. 313/310 |
| 6,525,461 B1 | * | 2/2003 | Iwasaki et al. ............. 313/495 |
| 6,538,368 B1 | * | 3/2003 | Fox et al. ................... 313/311 |
| 6,558,968 B1 | * | 5/2003 | Ramamoorthi et al. ....... 438/20 |
| 6,593,950 B2 | * | 7/2003 | Nomura et al. ............. 347/122 |
| 6,703,252 B2 | * | 3/2004 | Chen et al. ................... 438/20 |
| 6,753,544 B2 | * | 6/2004 | Chen et al. ................... 257/10 |

* cited by examiner 75A of Au on oxide

TUNNELING EMITTER WITH NANOHOLE OPENINGS

CROSS REFERENCE TO RELATED APPLICATIONS

This application is a continuation in part of commonly assigned U.S. patent application Ser. No. 09/846,127, filed Apr. 30, 2001, now U.S. Pat. No. 6, 781,146 which is hereby incorporated by reference, and also a continuation in part of commonly assigned U.S. patent application Ser. No. 09/846,047, filed Apr. 30, 2001, now U.S. Pat. No. 6,753,544.

BACKGROUND

Several different electron emission devices have been proposed and implemented to create electron emissions useful for displays or other electronic devices such as storage devices. Traditionally, vacuum devices with thermionic emission such as electron tubes required the heating of cathode surfaces to create the electron emission. The electrons are drawn in a vacuum space to an anode structure that is at a predetermined voltage potential to attract the electrons. For a display device such as a cathode ray tube, the anode structure is coated with phosphors such that when an electron impinges on the phosphor, photons are generated to create a visible image. Cold cathode devices such as spindt tips (pointed tips), which use electric field emission, have been used to replace the hot cathode technology. However, it has been difficult to reduce the size and integrate several spindt tips while maintaining reliability. As the size is reduced, the spindt tip becomes more susceptible to damage from contaminants in the near vacuum space that are ionized when an electron strikes them. The ionized contaminants are then attracted to the spindt tip and collide with it, thereby causing damage. To increase the life of the spindt tip, the vacuum space must have an increasingly higher vacuum (that is, remove the contaminants). A flat emitter having a larger emission surface than spindt tip emitters can be operated reliably at lower vacuum requirements. However, for some applications, the amount of current density from conventional flat emitters is not high enough to be useful. Thus a need exists to create a flat emitter that has high current density that is also able to operate reliably in low vacuum environments.

SUMMARY

An emitter has an electron supply and a porous cathode layer having nanohole openings. The emitter also has a tunneling layer disposed between the electron supply and the cathode layer.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar parts through the several views.

DETAILED DESCRIPTION

Figure 1:
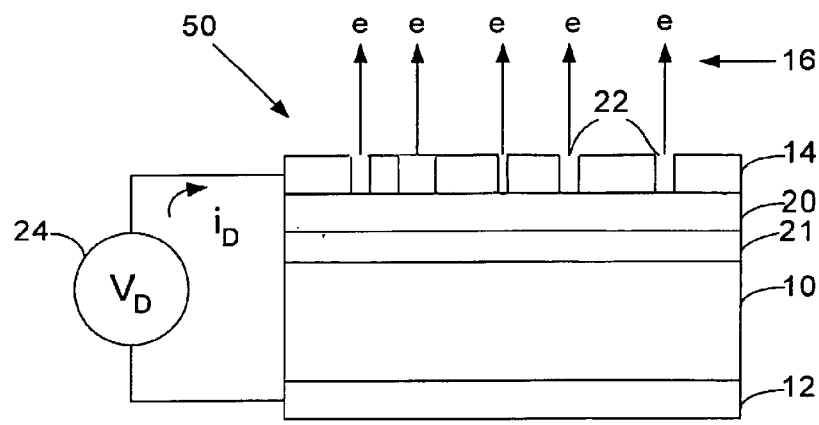
FIG. 1 is an exemplary illustration of a tunneling emitter embodiment of the invention.

The present invention is directed to tunneling emission emitters that provide high levels of emission current per square centimeter by using a tunneling layer that has a sufficient thinness of less than about 500 Angstroms to create a high electric field between an electron source and a flat cathode surface. Conventional flat emitter type devices have low emission current per square centimeter of surface area (i.e. less than 0.001 mA/cm$^2$) and thus are not usable in several applications that currently use spindt tip emitters. The invention uses a thin deposition of a high field strength dielectric such as a metal cluster dielectric (i.e. TiO$_x$) with a thickness of less than 500 Angstroms, such as between 50 and 250 Angstroms and for instance, around about 100 Angstroms, to create a barrier in which electrons can tunnel between the electron source and the cathode surface. By using such a material, the emission current can be greater than 10 mAmps, 100 mAmps, or even more than 1 Amp per square centimeter which is one, two, or almost three orders of magnitude, respectively, greater than that of conventional flat emitter technology. Empirical testing of actually produced emitters have had current densities even high such as about 7 Amps/cm$^2$ or more. The actual emission rate will depend upon the design choices of the type and thickness of material used for the tunneling layer (for instance, metal cluster dielectrics, silicon oxides such as rapid thermal process grown silicon oxides, silicon oxynitrides, polysilicon, silicon nitride, and silicon carbide to name just a few).

The increased electron emission is made possible by the use of a porous cathode layer, which has nanohole-sized openings. By having these nanohole-sized openings in the cathode layer, electrons, which normally tunnel without sufficient energy to escape through the cathode layer, are allowed to escape through the openings. With such nanohole-sized openings, the electric field remains high and substantially uniform even across the surface of the emitter. There is even an increase in the electric field due to the edge effect of the nano opening that helps to create a higher electric field in the proximity of the opening. One method of creating the nanohole-sized openings is to subject the emitter to an annealing process. For a platinum cathode layer preferably the annealing occurs in a nitrogen-containing environment. With a gold cathode layer, it is possible to create the nanohole opening by very carefully controlling the thickness of the deposited layer, although annealing the gold cathode layer can also further increase the nanohole openings. During an annealing process to create nanohole openings, the cathode layer changes its morphology as the openings are created. The nanohole openings formed provide for emission sites uniformly across the surface of the emitter on average, although the annealing process may randomly create variable spacing and size of the nanoholes.

The nanoholes provide additional benefits in addition to the increased emission current density. The nanoholes help prevent early breakdown damage of the cathode thin metal layer due to non uniformity of the electric field due to surface defects in the deposited thin film materials. While not meant to be limiting, this prevention of early breakdown damage is believed due to the nanoholes preventing stress build-up due to the ability of the nanoholes to allow electrons to exit the cathode layer. The nanoholes also reduce emission spiking by allowing electrons with different momentums to escape through the openings. These benefits result in longer life, higher reliability, and more predictable operation over emitters that do not have nanohole-sized openings. The nanoholes may have different shapes and still be effective. The nanoholes may be circular, crack-like (having a small width and a longer length), fissures, voids, serpentine structures, or openings between interconnected islands of cathode materials. The nanohole-sized openings are preferably sized in terms of width (the smallest dimension), length (the largest dimension) or diameter (if roughly circular, the average opening dimension). Preferably the nanoholes have absolute dimensions of less than about 500 nanometers such as between about 1 and about 400 nanometers, and preferably between about 1 to about 10 nanometers for the narrowest (width) dimension and about 10 to about 100 nanometers for a length dimension such as with cracks or fissures. The distribution of the nanoholes is preferably uniform across the surface of the emitting surface (at least on average) and spaced sufficiently so that the cathode layer maintains a contiguous electrical connection over the surface of the emitter. Therefore the cathode layer may be discontinuous (in that there are openings) but contiguous (in that it maintains electrical interconnection across its surface) in its morphology. The nanoholes can be either of a uniform size or randomly distributed in size. The spacing of the nanoholes may be either uniformly or randomly spaced but on average should be distributed uniformly (at least on average) across the surface of the emission surface to prevent localized concentration of emissions that may damage the emitter.

An additional benefit of the annealing process is that the tunneling resistance of the tunnel layer is reduced by at least a factor of 2 and preferably more. Also, the annealing process decreases the contact resistance of the thin-film interfaces. This decrease in tunneling and contact resistance allows for more electrons to tunnel across the barrier for a given voltage across the emitter. This tunneling resistance along with the nanohole openings result in an electron tunneling emitter having an emission efficiency of greater than 1% such as up to about 7% when a ballast layer is used.

Further advantages and features of the invention will become more apparent in the following description of the invention, its method of making and various applications of use.

In the illustrations of this description, various parts of the emitter elements have not been drawn to scale. Certain dimensions have been exaggerated in relation to other dimensions in order to provide a clearer illustration and understanding of the present invention. For the purposes of illustration, the embodiments illustrated herein are shown in two-dimensional views with various regions having depth and width. It should be understood that these region are illustrations only of a portion of a single cell of a device, which may include a plurality of such cells arranged in a three-dimensional structure. Accordingly, these regions will have three dimensions, including length, width, and depth when fabricated on an actual device.

Further, one aspect of the invention is that it can be fabricated using conventional integrated circuit thin-film technologies. By using conventional technologies, the emitters of the invention can be incorporated onto conventional integrated circuits further increasing their applicability to several applications. Several different technologies and equipment exist to perform several of the process steps and can be interchanged by those having skill in the art. For example, unless specifically called out, deposition of material can be by one of several processes such as evaporation, sputtering, chemical vapor deposition, molecular beam epitaxy, photochemical vapor deposition, low temperature photochemical vapor deposition, and plasma deposition, to name a few. Additionally, several different etch technologies exist such as wet etching, dry etching, ion beam etching, reactive ion etching, and plasma etching such as barrel plasma etching and planar plasma etching to name some of the possible etching technologies. Choice of actual technologies used will depend on material used and cost criteria among other factors.

FIG. 1 is an exemplary diagram of an emitter device 50, a flat emitter for electron emission, which includes an electron source 10. On the electron source 10 is disposed an optional, but preferable ballast layer 21 and a tunneling layer 20. Optionally the ballast layer 21 and the tunneling layer 20 may be combined into a single layer. One example of a ballast layer is granular amorphous polysilicon that has an asymmetric sheet resistance with the least resistance in the direction of the thickness of the material (orthogonal to the plane of the layer). Several different materials and processes for creating ballast layers exist such as described in commonly assigned U.S. patent application Ser. No. 10/066158, filed Jan. 31, 2002 and entitled "EMITTER AND METHOD OF MAKING," which is incorporated herein by reference. The purpose of the ballast layer 21 is to provide for uniform emissions over the surface of the emitter by balancing the voltage applied across the tunneling layer 20. Preferably, the tunneling layer 20 is formed from a high dielectric strength dielectric material such as a metal cluster dielectric. Some examples of metal cluster dielectrics include tungsten silicon nitrate (WSiN) or tantalum oxide (TaO$_x$), titanium oxide (TiO$_x$, where x=0.5 to 2.5). Also, tantalum aluminum oxynitride (TaAlO$_x$N$_y$), tantalum aluminum oxide (TaAlO$_x$), aluminum oxynitride (AlO$_x$N$_y$) or other transitionary metal (TM) oxides or oxynitrides ((TM)O$_x$ or (TM)O$_x$N$_y$) are envisioned as being capable of use as tunneling layer 20. Other suitable tunneling layers include silicon oxides such as rapid thermal process grown silicon oxides, silicon nitride, silicon oxynitrides, and silicon carbide, to name a few. Other dielectrics exist and are known to those of skill in the art such as granular amorphous polysilicon, crystalline polysilicon, porous polysilicon and nanoformed polysilicon structures. The tunneling layer preferably has a thickness less than 500 Angstroms and more preferably the thickness is within the range of about 50 to about 250 Angstroms, such as about 100 Angstroms. The chosen thickness determines the electrical field strength that the tunneling layer must be able to withstand and affects the desired emitter emission current. Disposed on the tunneling layer 20 is a cathode layer 14, preferably a thin-film conductor such as platinum, gold, molybdenum, iridium, ruthenium, tantalum, chromium, or other refractive metals or alloys thereof. Preferably, the thickness of the cathode layer is 30 to 150 Angstroms with about 50 to about 100 Angstroms more preferable. The cathode layer preferably has nanohole openings 22 on the order of about 1 to about 400 nanometers in length, width or diameter openings, and more preferably within the range of about 1 to about 10 nanometers for narrowest (width) and diameter openings and about 10 to about 100 nanometers in length such as for cracks and fissures. Preferably, the narrowest width or diameter nanohole opening 22 is less than 10% of the thickness of the tunneling layer 20. These nanohole openings 22 help create electron emission sites.

When a voltage source 24 having an emitter voltage V$_D$ (about 3–30V depending on the emitter design) is applied to the cathode layer 14 and electron supply 10 via a contact 12, electrons tunnel from the substrate 10 (an electron supply) to the cathode layer 14. Because of the nanohole-sized openings 22 within the tunneling layer 20, the electric field in which the electrons tunnel through is very strong and substantially uniform over the surface of the emitter allowing for the electron emission 16 from the surface of the cathode layer 14 to be greater than with conventional designs. The nanohole openings 22 allow the electrons that tunnel through the tunneling layer to exit from the emitter without colliding into the cathode layer material and thereby preventing a loss of momentum that would keep the electrons from escaping the surface of cathode layer 14.

The electron field is calculated for various thicknesses as $$\vec{E} = \frac{V_D}{t_{thickness}}$$

where $t_{thickness}$ is the thickness of tunneling layer 20. For example, for a V$_D$=10V, the electric field is equal to $10^7$ volts/meter for a 100 Angstrom thickness in the tunneling layer. The electric field strength will be affected minimally by the nanohole openings 22 as described in FIGS. 14 and 15 below.

Preferably, the tunneling layer 20 is uniformly deposited such as by sputtering. For example, when using metal cluster dielectrics as the tunneling layer, very high electric field strength can be applied between the electron source 10 and the cathode layer 14 to achieve higher emission, because the metal cluster dielectrics withstand much higher electrical field strength without electrical breakdown than other dielectrics. However, other dielectrics may be able to provide more uniform deposition thicknesses or have less stress within the thin-film layer. Actual design choice of the dielectric will depend on the application and the desired emission current density. The examples described within this specification are for reference only in showing the applicability of the invention to practical electronic devices and are not meant to limit the scope of the invention, which is defined by the claims and their equivalents.

Figure 2:
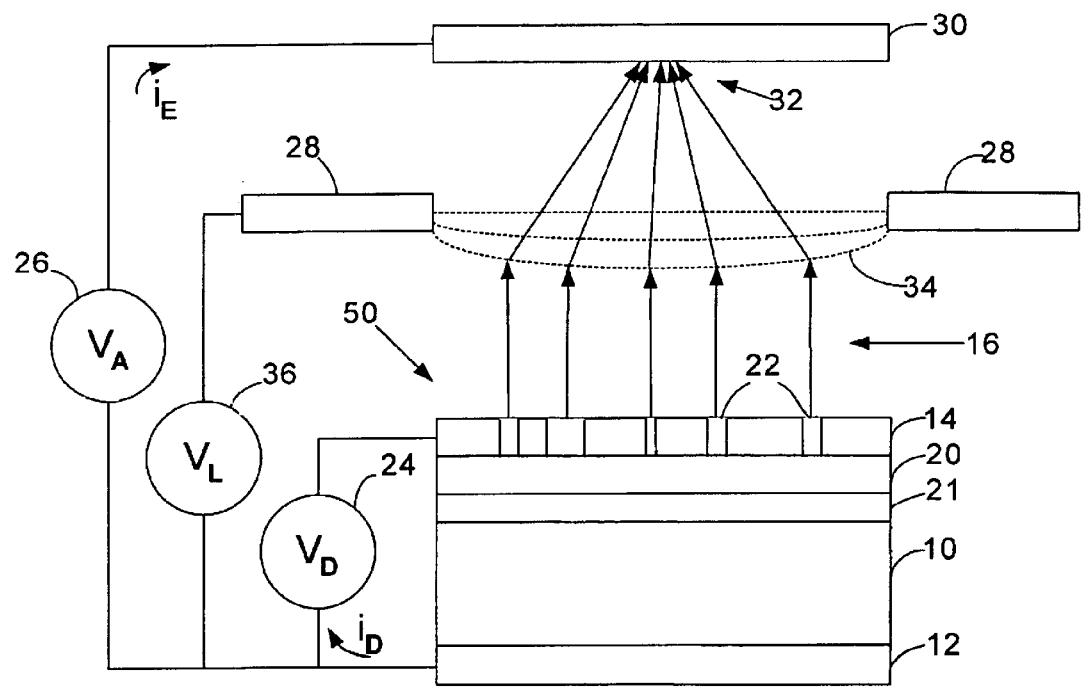
FIG. 2 is an exemplary illustration of the use of the tunneling emitter of FIG. 1 to create a focused electron beam.

FIG. 2 is an exemplary diagram of a use for the emitter 50 of FIG. 1. In this application, the electron emission 16 is focused by an electrostatic focusing device or lens 28, exemplified as an aperture in a conductor that is set at predetermined voltage that can be adjusted to change the focusing effect of the lens 28. Those skilled in the art will appreciate that lens 28 can be made from more than one conductor layer to create a desired focusing effect. The electron emission 16 is focused by lens 28 into a focused beam 32 onto an anode structure 30. The anode structure 30 is set at an anode voltage V$_A$ 26 which magnitude varies for an application or test environment depending on the intended use and the distance from the anode structure 30 to the emitter 50. For instance, with anode structure 30 being a recordable medium for a storage device, V$_A$ might be chosen to be between 500 and 1000 Volts. The lens 28 focuses the electron emission 16 by forming an electric field 34 within its aperture. By being set at a proper voltage from V$_D$, the electrons emitted from the nanohole openings 22 of the emitter 50 are directed to the center of the aperture and then further attracted to the anode structure 30 to form the focused beam 32.

The efficiency of the tunneling emitter 50 is the ratio of the emission current i$_E$ with respect to the current i$_D$ supplied to the tunneling emitter 50. The current shown is the conventional positive current flow. The negative current and thus electron flow is in the opposite direction. One advantage of the invention is that the emitter efficiency is increased due to the positive effects created by the nanohole openings 22, the decreased tunneling resistance of the tunneling layer, and the decreased inter-layer contact resistance. The efficiency of test models of the invention have reached about 1% for emitters without ballast layers and about 7% for emitters having ballast layers.

Figure 3:
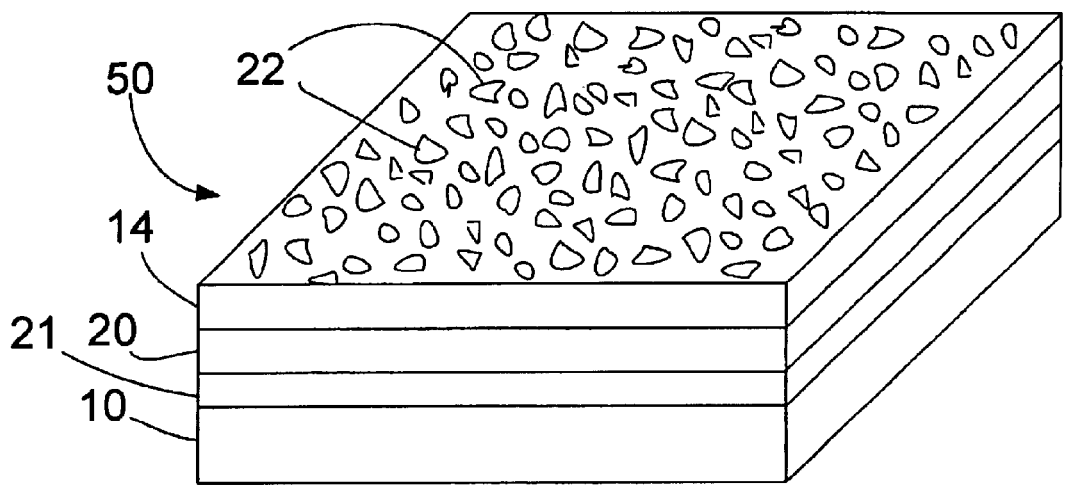
FIG. 3 is an exemplary perspective view of a tunneling emitter with a cathode layer that includes nanohole openings in one embodiment of the invention.

FIG. 3 is an exemplary perspective view of an emitter 50 that illustrates the nanohole-sized openings 22 within the surface of the cathode layer 14. The nanohole-sized openings 22 are substantially uniformly distributed on average over the surface of the emitter although the actual spacing between nanoholes may be random as well as the actual size of the nanoholes. The nanoholes are preferably sized less than 500 nanometers such as about 1 to 400 nanometers and preferably about 1 to 10 nanometers in the narrowest dimension, and about 10 to 100 nm in length such as with cracks and fissures. Although using an annealing process forms the nanoholes described within, other methods of creating the nanoholes exist using sub-micron technology equipment such as by nanostamping. Nanostamping would allow nanoholes to be formed that are of a uniform size and uniformly spaced. Using the optional ballast layer 21 ensures that electrons will be uniformly distributed to the nanoholes over the surface of the electron source and tunneling layer, although depending on the particular application, the ballast layer 21 may not be required.

Figure 4:
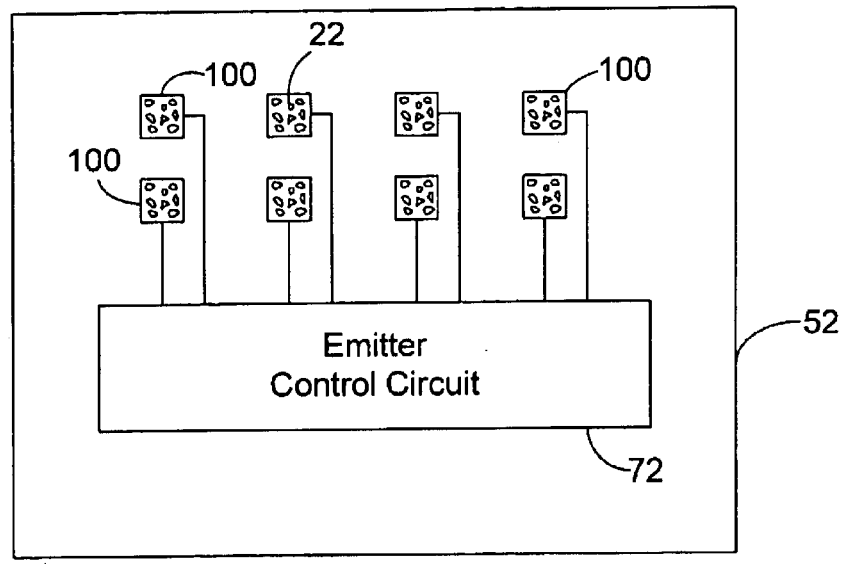
FIG. 4 is an exemplary block diagram of an embodiment of an integrated circuit that incorporates multiple tunneling emitters and control circuitry.

FIG. 4 is an exemplary embodiment of an integrated circuit 52 that includes at least one integrated emitter 100 with nanohole openings 22 but preferably a plurality of integrated emitters 100 organized in an array. An emitter control circuit 72 is integrated onto the integrated circuit 52 and used to operate the at least one integrated emitter 100. Because of the increased efficiency of the emitters due to the invention, less voltage needs to be applied to the emitters for a given current density. This lowering of the applied voltage allows the emitters 100 to be combined with conventional logic circuitry such as CMOS, NMOS, HVCMOS and BiMOS integrated circuit technology, to name a few. This integration is generally not possible with conventional field emission devices such as spindt tip emitters because they require emitter voltages generally in the 40–100 Volt range for acceptable emission currents even though they have near 100% efficiency. The 40–100 Volt range required for operation of the spindt tips can damage conventional IC circuits.

Figure 5:
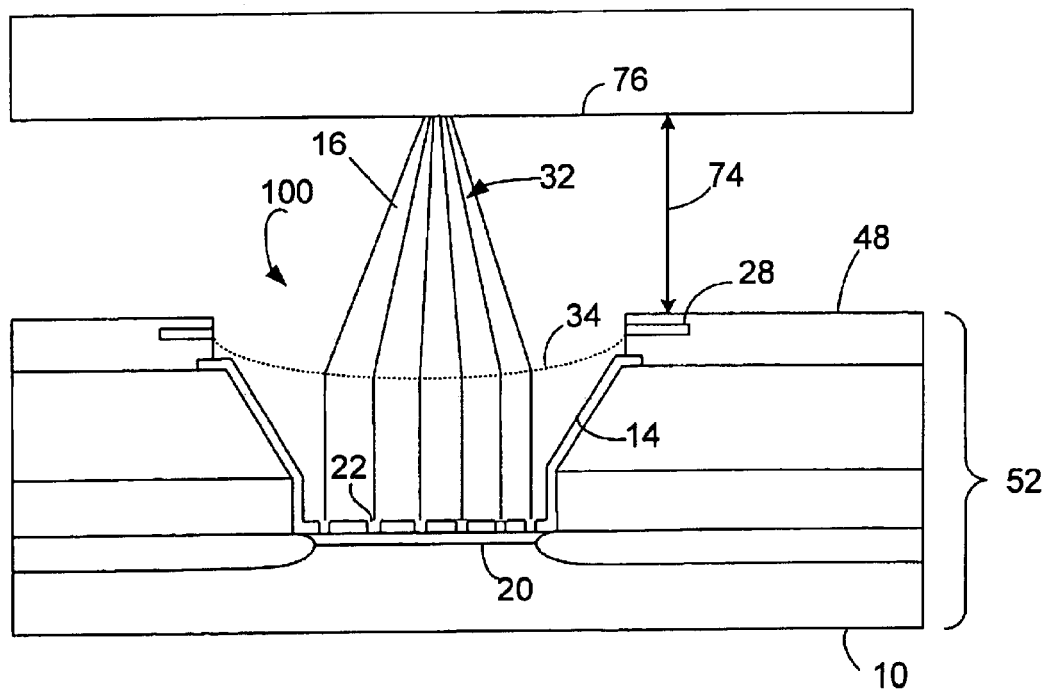
FIG. 5 is an exemplary embodiment of a tunneling emitter on an integrated circuit that includes a lens for focusing the energy emissions from the tunneling emitter.

FIG. 5 is an exemplary embodiment of an integrated circuit 52 that includes an integrated emitter 100 and a lens array 48. The integrated circuit 52 is formed on a conductive substrate 10, preferably heavily doped silicon or a conductive material such as a thin film conductive layer to provide an electron source. On the substrate 10 (or ballast layer 21, if provided) is disposed a tunneling layer 20 having a thickness of less than 500 Angstroms, preferably about 100 Angstroms though a thickness in the range of about 50 to 250 Angstroms may be desirable for some applications. Different layers of semiconductor thin-film materials are applied to the substrate 10 and etched to form the integrated emitter 100. Disposed on the tunneling layer 20 is a cathode layer 14, preferably a thin-film conductive layer of platinum, gold, or gold with a tantalum adhesive layer. Other possible materials for cathode layer 14 are molybdenum, iridium, ruthenium, tantalum, chromium, or other refractive metals or alloys thereof. The cathode layer 14 forms a cathode surface from which energy in the form of electrons are emitted through at least the nanohole openings 22 and possibly also through the cathode material itself. The lens array 48 is applied using conventional thin-film processing and includes a lens 28 defined within a conductive layer and aligned with the integrated emitter 100 to focus the energy from the integrated emitter 100 onto a surface of an anode structure 76. Anode structure 76 is located a target distance 74 from the integrated circuit 52.

Figure 6:
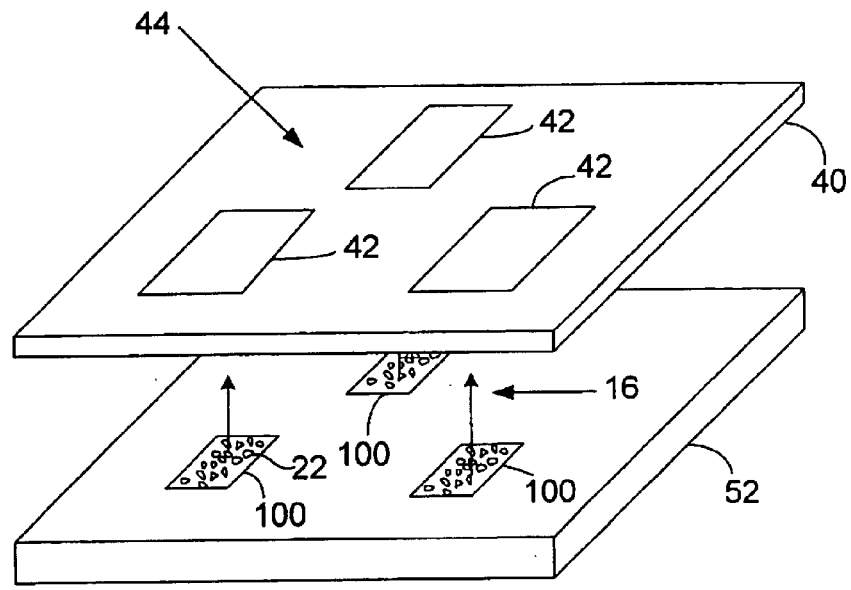
FIG. 6 is an exemplary display embodiment that is created from an integrated circuit that includes multiple tunneling emitters and an anode structure that creates photons.

FIG. 6 is an embodiment of a display application using the integrated emitter 100 of the invention. In this embodiment, a plurality of integrated emitters 100 is arraigned and formed in an integrated circuit 52. Each of the integrated emitters 100 emits electron emissions 16 preferably from nanohole openings 22. An anode structure, display 40, receives the emitted energy in display pixel 44, made up of display sub-pixels 42. Display sub-pixel 42 is preferably an electrophosphorescent or other material that creates photons when struck by the electron emission 16.

Figure 7:
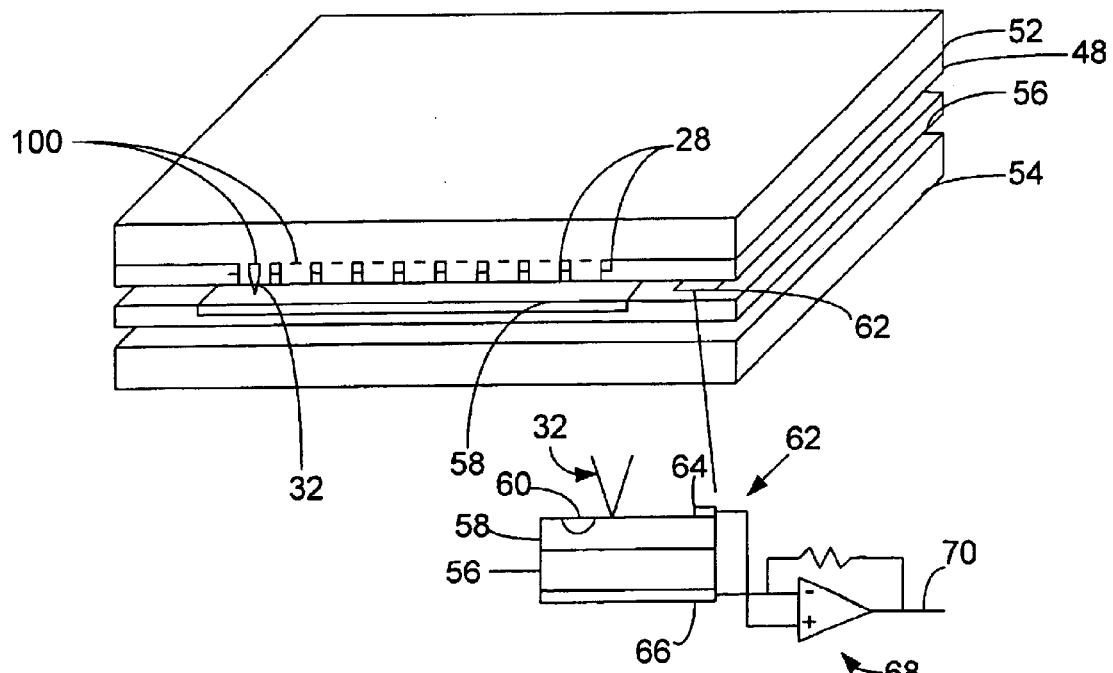
FIG. 7 is an exemplary embodiment of a storage device that incorporates an integrated circuit that includes multiple tunneling emitters for reading and recording information onto a rewriteable media.

FIG. 7 is an alternative use of an integrated emitter 100 within in a storage device. In this exemplary embodiment, an integrated circuit (IC) 52 having a plurality of integrated emitters 100 has a lens array 48 of focusing mechanisms aligned with integrated emitters 100. The lens array 48 is used to create a focused beam 32 that is used to affect a recording surface, media 58. Media 58 is applied to a mover 56 that positions the media 58 with respect to the integrated emitters 100 on IC 52. Preferably, the mover 56 has a reader circuit 62 integrated within. Optionally, the reader circuit 62 can be located on a stator substrate 54 or integrated circuit 52 via the use of ohmic contacts between the different substrate levels. The reader 62 is shown as an amplifier 68 making a first ohmic contact 64 to media 58 and a second ohmic contact 66 to mover 56, preferably a semiconductor or conductor substrate. When a focused beam 32 strikes or bombards the media 58, if the current density of the focused beam is high enough, the media is phase-changed to create an effected media area 60. When a low current density focused beam 32 is applied to the surface of media 58, amplifier 68 to create reader output 70 detects different rates of current flow. Thus, by affecting the media with the energy from the emitter 50, information is stored in the media using structural phase changed properties of the media. One such phase-change material is $In_2Se_3$.

One optional phase-change material for a read/writeable (or write/erase/write) state-change element is germanium telluride (GeTe), which can be reversibly changed from a semiconducting (amorphous) to a metallic (crystalline) state by heating and cooling it at a proper rate. For example, if the GeTe is doped so that it is p-type when in its semiconducting state and is deposited on top of an n-type semiconductor-layer, then a large contrast will be seen in the number of carriers swept across the junction if the GeTe is changed to its metallic state. By using GeTe or equivalent phase-change material, the media 58 is capable of being readwriteable, e.g. being capable of writing, erasing, writing many times. This function increases the utility of the structure of media 58 for some applications. Other phase-change materials can be substituted for GeTe and still meet the spirit and scope of the invention. Some examples of other preferable phase-change materials are chalcogenide alloys such as: GaSb, InSb, InSe, $Sb_2Te_3$, $Ge_2Sb_2Te_5$, InSbTe, GaSeTe, $SnSb_2Te_4$, InSbGe, AgInSbTe, (GeSn)SbTe, GeSb(SeTe), $Te_{81}Ge_{15}Sb_2S_2$ and GeSbTe. Additionally, other phase change materials are known to those skilled in the art and can be substituted without changing the scope and spirit of the invention.

Figure 8:
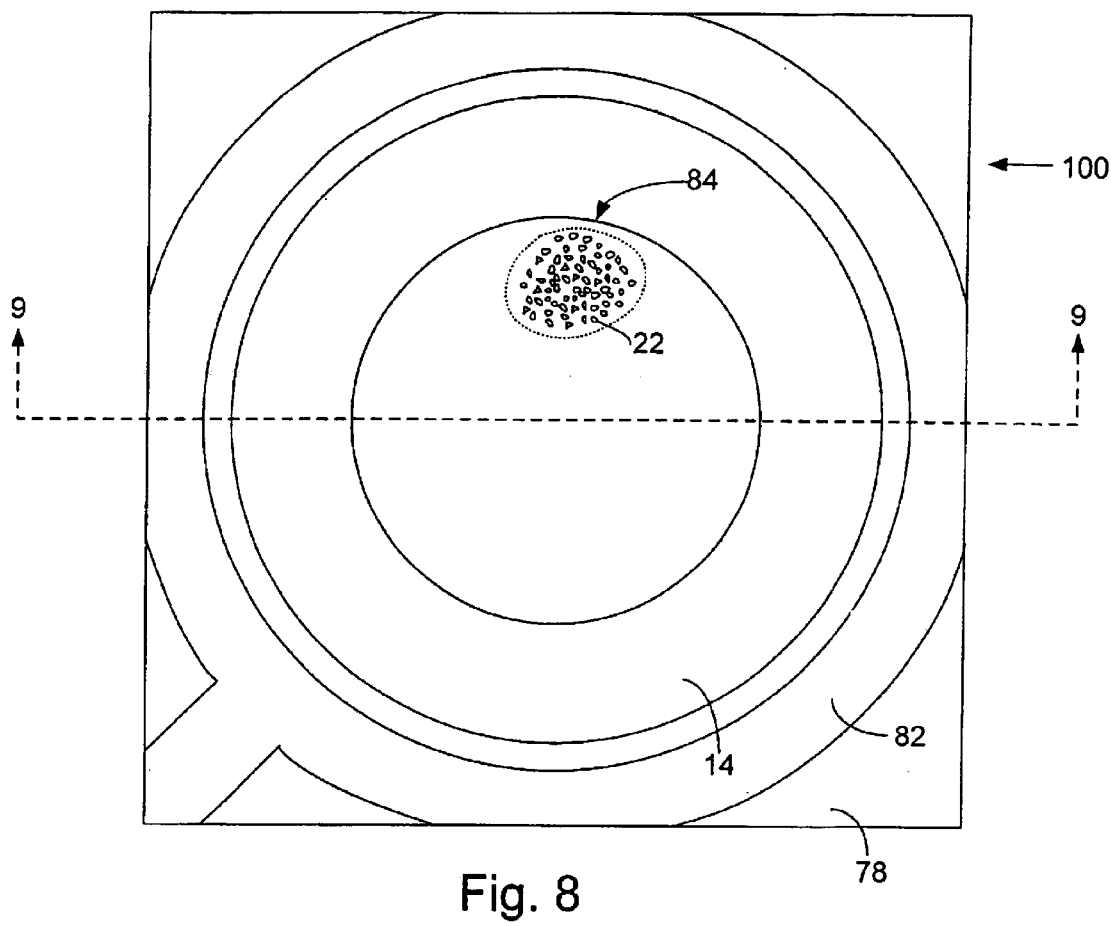
FIG. 8 is a top view of an exemplary embodiment of a tunneling emitter with nanohole openings.

FIG. 8 is a top view of an exemplary embodiment of the invention of an integrated emitter 100 that includes an emitter area 84 within the cathode layer 14. A portion of the cathode layer 14 is shown magnified to display the nanohole openings 22. In actual practice, the nanohole openings are on average uniformly distributed over the surface of at least the emitter area 84 although they may be randomly spaced and randomly sized. The cathode layer 14 is electrically coupled to and disposed on conductive layer 82 that is disposed over insulator layer 78. Integrated emitter 100 is shown as preferably a circular shape, however other shapes can be used. The circular shape is preferable in that the electric fields generated are more uniform as there are no discrete edges within the shape to alter the electric fields.

Figure 9:
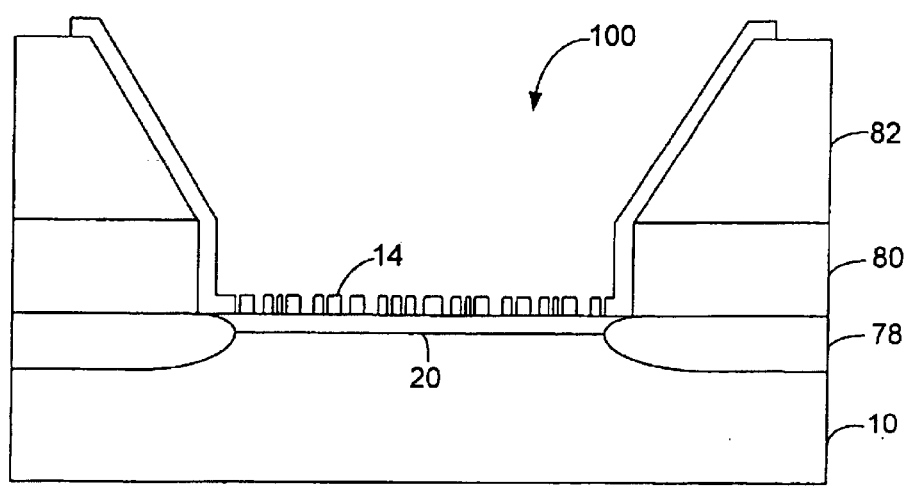
FIG. 9 is an exemplary cross-sectional view of the tunneling emitter shown in FIG. 8.

FIG. 9 is a cross-section of the exemplary embodiment of integrated emitter 100 shown in FIG. 8 looking into the 9—9 axis. A substrate 10, preferably a conductive layer or a highly doped semiconductor provides an electron supply to tunneling layer 20 that is disposed within an opening defined within an insulator layer 78. A cathode layer 14, preferably a thin-film conductive layer is disposed over the tunneling layer 20 with nanohole openings 22 (not shown to actual size which would be smaller) and partially over the conductive layer 82 thereby making electrical contact with the conductive layer. Optionally, an adhesion layer 80 can added to provide for a bonding interface between the conductive layer 82 and the insulator layer 78 depending on the particular materials chosen for insulator layer 78 and conductive layer 82.

Figure 10:
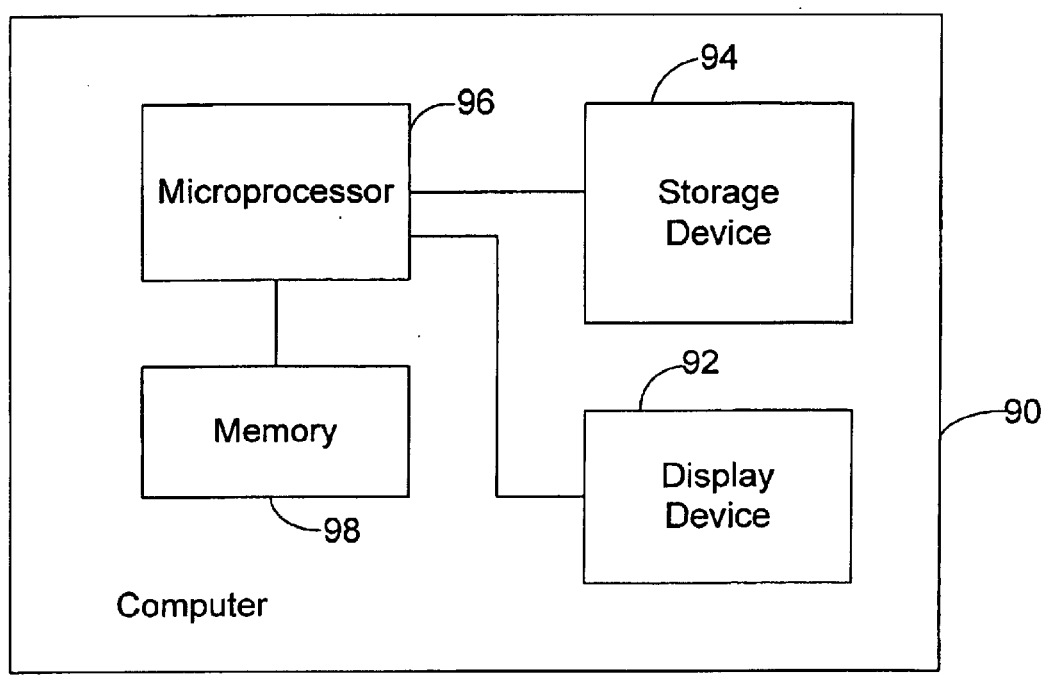
FIG. 10 is an exemplary block diagram of a computer that incorporates at least one electronic device, a display or storage device, which incorporate the tunneling emitters embodiments of the invention.

FIG. 10 is an exemplary block diagram of a computer 90 that includes a microprocessor 96, memory 98, which is coupled to the microprocessor 96, and electronic devices, a storage device 94 and a display device 92. The electronic devices are coupled to the microprocessor 96. The microprocessor 96 is capable of executing instructions from the memory to allow for the transfer of data between the memory and the electronic devices, such as the storage device 94 and the display device 92. Each electronic device includes an integrated circuit that has an emitter incorporating the invention and preferably a focusing device for focusing the emissions from the emitter. The emitter has an electron supply layer with an insulating layer disposed thereon. The insulating layer has an opening defined within which a tunneling layer is formed on the electron supply layer. On the tunneling layer is a cathode layer preferably having nanohole-sized openings 22. Preferably but optionally, the integrated circuit with the emitter has been subjected to an annealing process to create the nanohole openings 22 and lower the tunneling layer resistance thereby increasing the supply of electrons that can tunnel from the electron supply layer to the cathode layer. The annealing process also reduces the contact resistance between metal layers thereby enhancing the conductivity of electrons to the emitter.

Figure 11A:
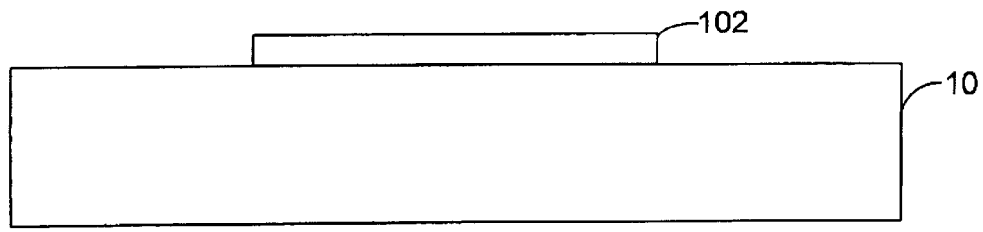
FIGS. 11A–11M are illustrations of exemplary steps used in an exemplary process to create the tunneling emitter embodiments of the invention.

FIGS. 11A to 11M illustrate exemplary process steps used to create an emitter incorporating the invention. In FIG. 11A, a mask 102, of dielectrics or photoresist is applied to a substrate 10, preferably a silicon semiconductor substrate, although substrate 10 might be a conductive thin-film layer or a conductive substrate. Preferably substrate 10 has a sheet resistance of about 100 to 0.0001 ohms centimeter.

Figure 11B:
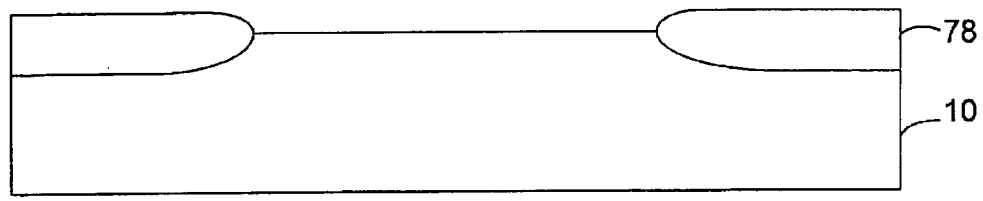

In FIG. 11B an insulator layer 78 is created, such as by field oxide growth when substrate 10 is a silicon substrate. Optionally, the insulator layer 78 can be formed of other oxide, nitride, or other conventional dielectrics deposited or grown alone or in combination using conventional semiconductor processes. The insulator layer 78 is created on the substrate 10 except in areas covered by mask 102. The area defined by mask 102, and thus the resulting voids or defined openings within insulator layer 78 determines the location and shape of the latter formed integrated emitter 100 when mask 102 is removed.

Figure 11C:
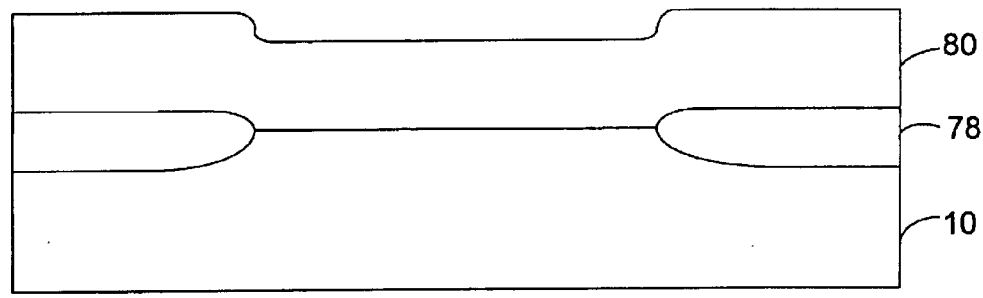

In FIG. 11C, an optional adhesive layer 80 is applied on the substrate 10 and insulator layer 78. The adhesive layer 80 is preferably tantalum when the later applied conductive layer 82 (see FIG. 11D) is made of gold. Preferably, the adhesive layer is applied using conventional deposition techniques. The adhesive layer is preferably about 100 to about 200 Angstroms thick but can be any thickness depending on the materials chosen. Optionally, a ballast layer 21 can be applied and patterned in the defined opening of insulator layer 78.

Figure 11D:
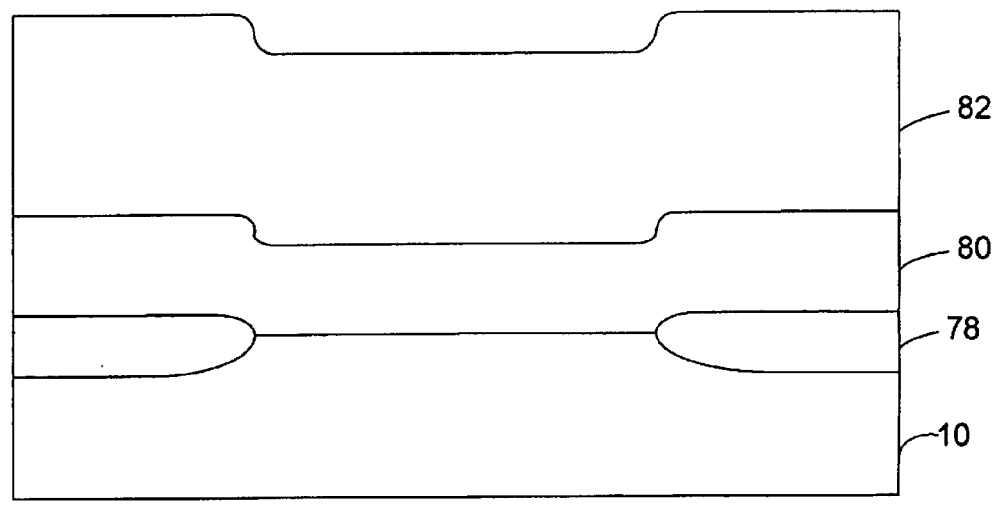

In FIG. 11D a conductive layer 82 is applied on the previously applied layers on substrate 10, such as adhesive layer 80 if used. Preferably, the conductive layer is formed using conventional deposition techniques. The conductive layer is for instance gold that is deposited to between about 500 to about 1000 Angstroms thick.

Figure 11E:
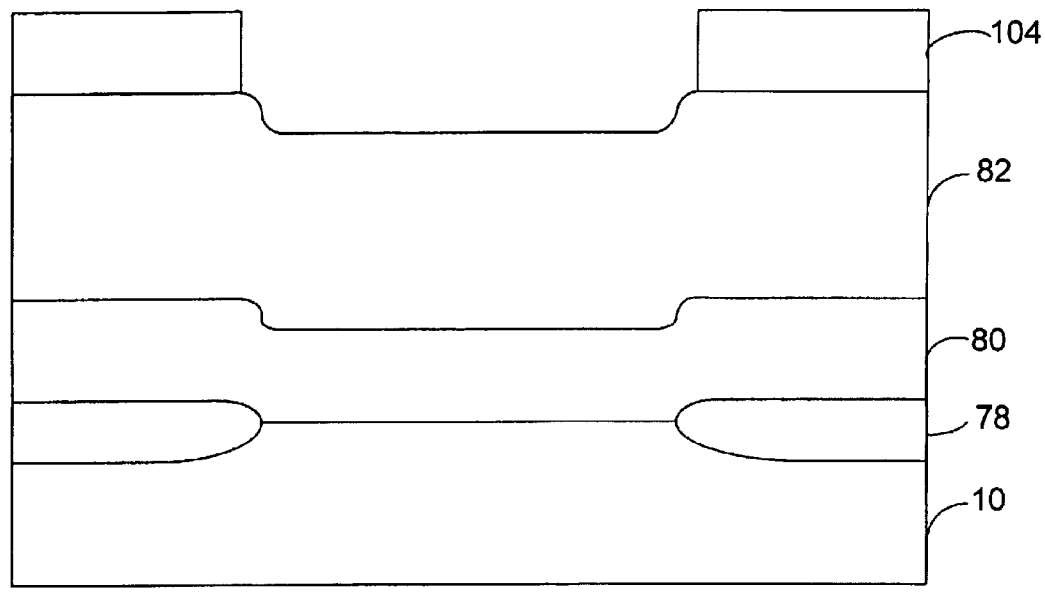

In FIG. 11E a patterning layer 104 is applied on the conductive layer 82 and an opening is formed within it to define an etching region for creating the integrated emitter. For example, the patterning layer 104 is a positive photoresist layer of about 1 urn thickness.

Figure 11F:
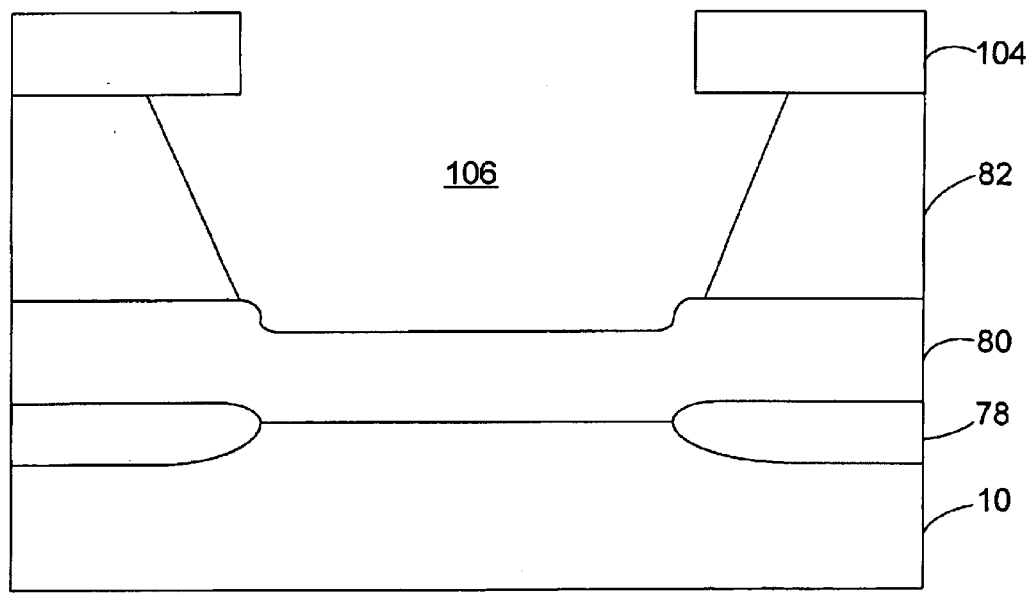

In FIG. 11F an exemplary wet etch process is used to create an opening in the conductive layer 82 within the opening of the patterning layer 104. Typically, the etching will create an isotropic etch profile 106 as shown in which a portion of the conductive layer is undercut under the patterning layer 104. Preferably the wet etch process used does not react with the adhesive layer 80, if used, to prevent the etch material from reaching the substrate 10. Optionally, a dry etch process can be used to etch the conductive layer 82.

Figure 11G:
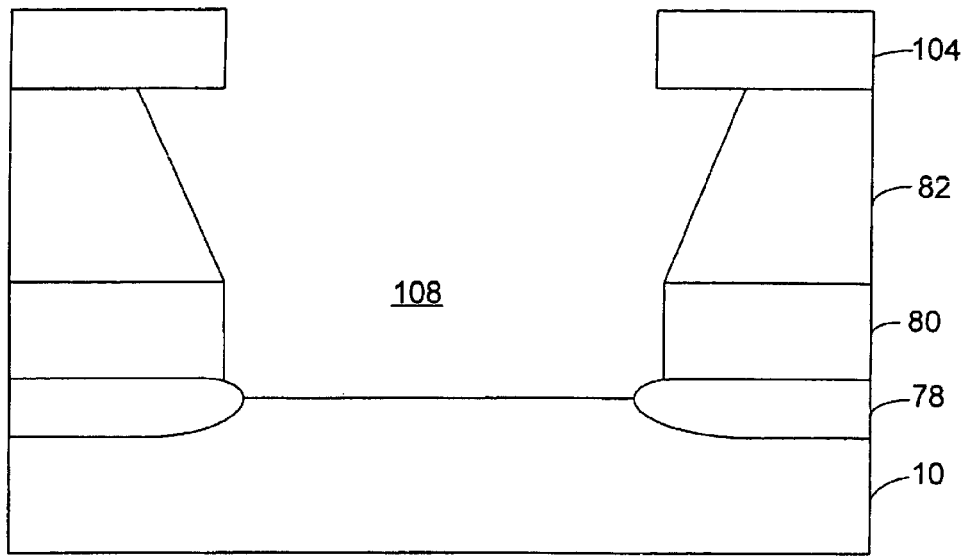

In FIG. 11G an exemplary dry etch process that is reactive to the adhesive layer 80 an essentially non-reactive to conductive layer 82 is used to create an anisotropic profile 108. If not previously applied, a ballast layer 21 can be applied over the surface of the processed substrate and in particular in the etched opening.

Figure 11H:
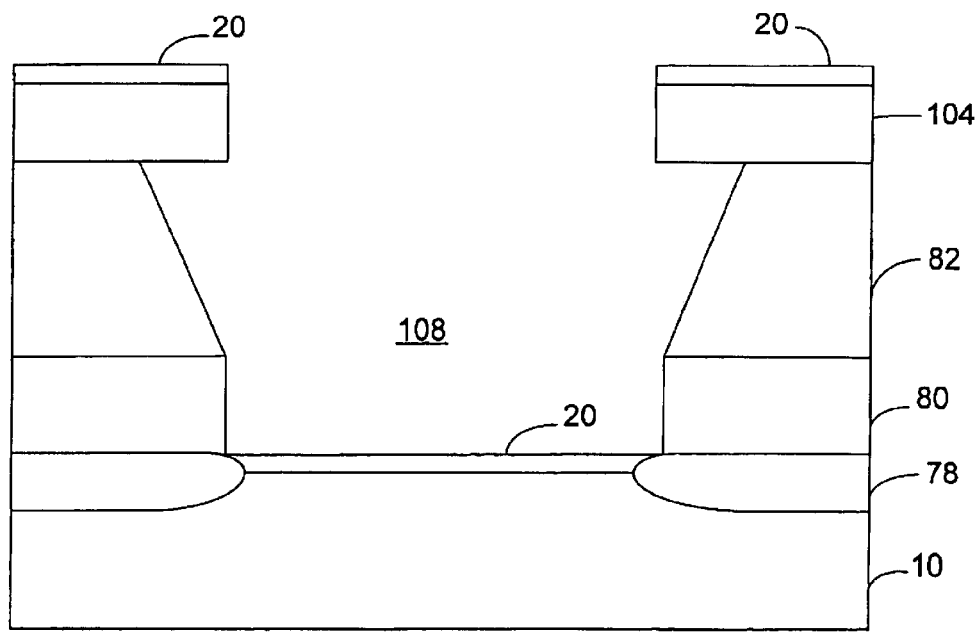

In FIG. 11H a tunneling layer 20 such as a high dielectric strength material for example, metal cluster dielectrics, $TiO_x$, $TaO_x$, WSiN, $TaAlO_xN_y$, $TaAlO_x$ or $AlO_xN_y$, but preferably $TiO_x$, is applied over the surface of the processed substrate 10 on the patterning layer 104 and openings in insulator layer 78. As discussed previously, other dielectrics can be used as well as pre-applying a ballast layer 21 (see FIG. 1). For example, a metal cluster tunneling layer 20 is deposited such as by sputtering the metal and introducing oxygen and/or nitrogen to form the dielectric to a thickness of less than about 500 Angstroms, such as between about 50 to about 250 Angstroms, for instance about 100 Angstroms. Another exemplary dielectric would be silicon oxide that is deposited using a plasma enhanced chemical vapor deposition process to provide good thin film uniformity.

Figure 11I:
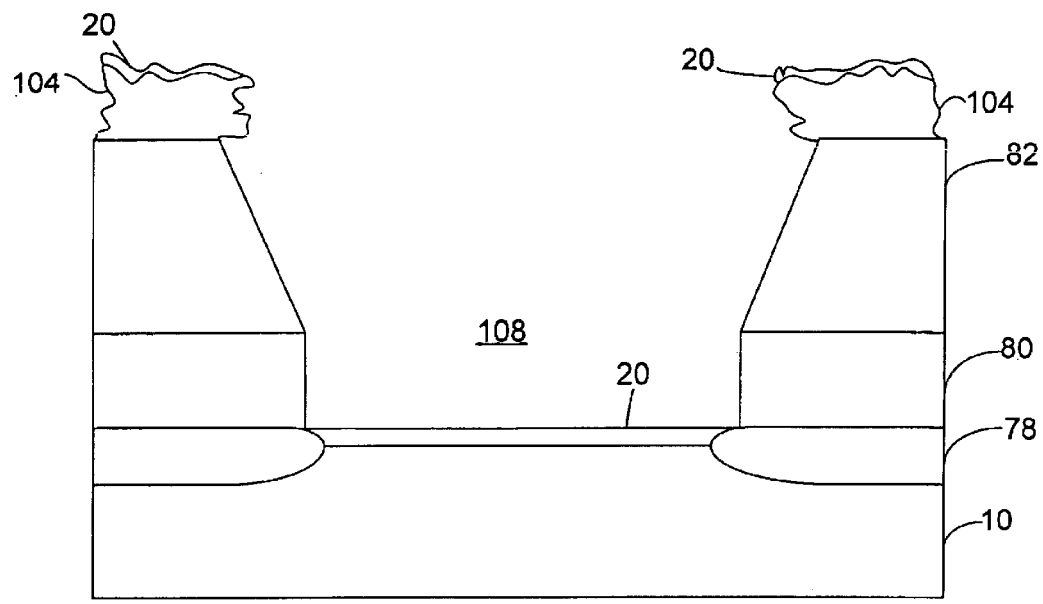

In FIG. 11I a lift-off process is used to remove patterning layer 104 and that portion of tunneling layer 20 that is disposed on the patterning layer 104. For example, low temperature plasma is used to reactively etch ash organic materials within the patterning layer 104. A gas such as oxygen is used in a planer plasma etch process. The processed substrate 10 is place in a chamber and the oxygen is introduced and excited by an energy source to create a plasma field. The plasma field energizes the oxygen to a high-energy state, which, in turn oxidizes the patterning layer 104 components to gases that are removed from the chamber by a vacuum pump. Because of their proximity and difference in volume ratios, some of the components of the patterning layer 104 during lift-off might react with constituents in the thin tunneling layer 20 disposed on the patterning layer 104. For example, carbon monoxide released from the patterning layer 104 reacts with the oxygen in a $TiO_x$ layer of tunneling layer 20 to form $CO_2$ gas which is then removed leaving a small amount of Ti on the surface of the conductive layer 82. Thus the tunneling layer 20 disposed on the patterning layer 104 is essentially removed in the lift-off process. After the lift-off process is complete, essentially only that portion of tunneling layer 20 that is disposed within the openings of insulator layer 78 remains.

Optionally, a wet lift-off process can be used in lieu of the plasma lift-off process. After the tunneling layer 20 is applied to the surface of the processed substrate 10, the substrate 10 is immersed in a solvent that will swell and remove the patterning layer 104 thus keeping the tunneling layer 20 disposed within the opening of insulator layer 78.

Figure 11J:
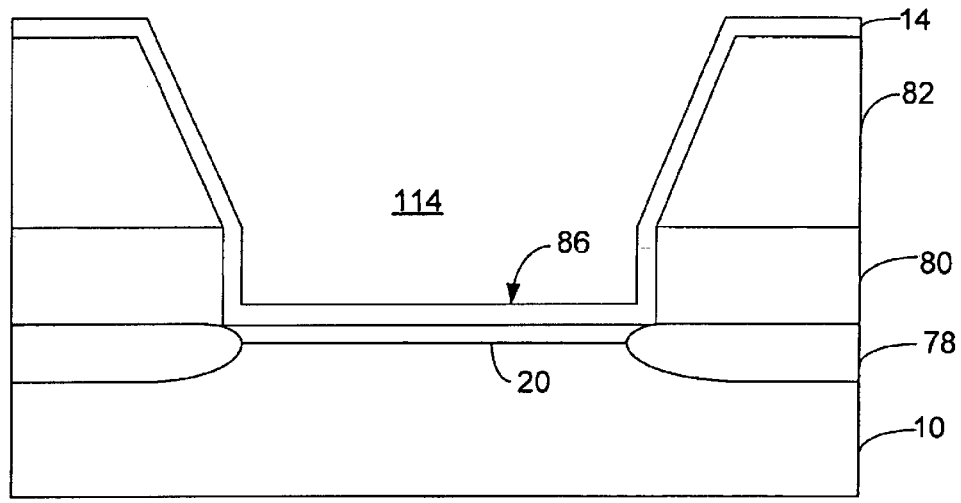

FIG. 11J shows the application of a cathode layer 14 over the surface of the processed substrate 10. The cathode layer 14 is preferably a thin-film metallic layer such as platinum and preferably has a thickness of about 50 to about 250 Angstroms. Other metals can be used for cathode layer 14 such as gold, molybdenum, iridium, ruthenium, tantalum, chromium, or other refractive metals or alloys thereof. The cathode layer 14 disposed on tunneling layer 20 forms the emitter surface 86 within the emitter chamber 114.

When using gold as cathode layer 14, it is preferable to first deposit an adhesive layer to provide for better contact of the gold. This adhesive layer is preferably tantalum with a thickness of less than 10 Angstroms for a gold layer of less than 100 Angstroms. If too thick of an adhesive layer is used, it will be difficult to create nanohole openings in the gold layer. If the gold layer thickness can be adequately controlled less than 100 Angstroms, the natural tendency of gold to aggregate can create sufficient nanohole openings without annealing. It is preferable to anneal the emitter though to obtain the additional benefits of annealing such as decreased tunneling and contact resistance.

Figure 11K:
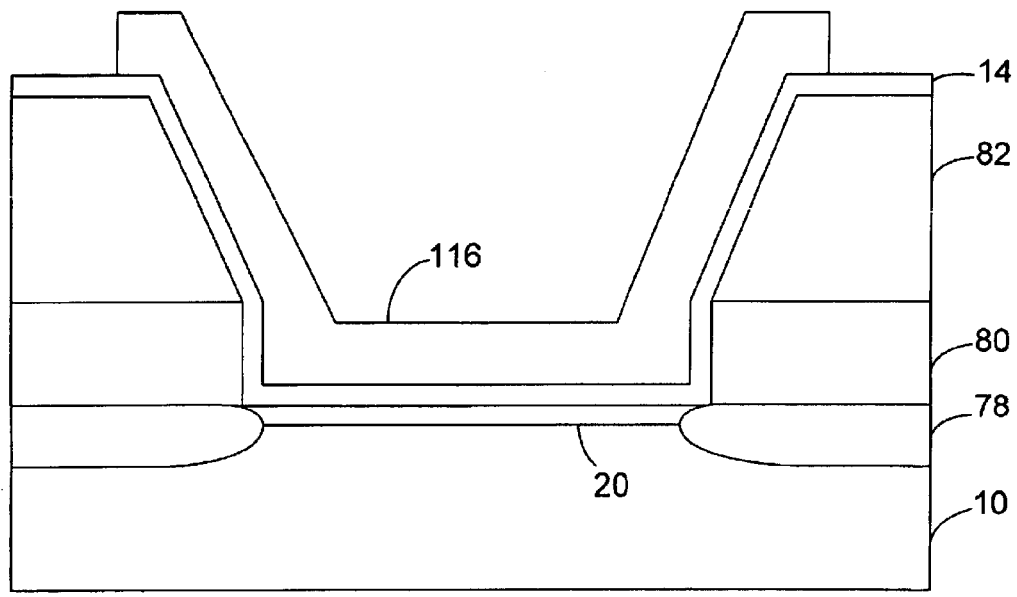

FIG. 11K illustrates the application of a cathode photoresist layer 116 that has been applied and patterned to define openings where the cathode layer 14 is to be etched to isolate multiple emitters on the substrate 10.

Figure 11L:
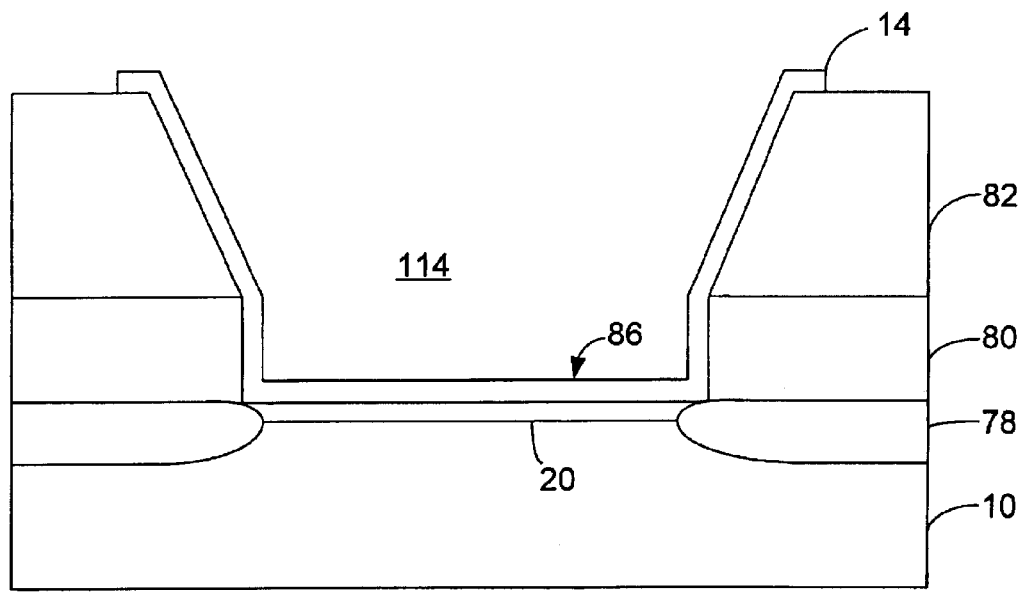

FIG. 11L illustrates the cathode layer 14 after it has been etched and the cathode photoresist 116 removed. Within the emitter chamber 114 is the emitter surface 86. An exemplary top view of the resulting structure is shown in FIG. 8. The emitter surface 86 has a first area. The emitter chamber 114 has a first chamber section interfacing to the emitter surface 86 that has substantially parallel sidewalls within the adhesion layer 80. The emitter chamber 114 has a second chamber section formed in the conductive layer 82 that has sidewalls that diverge to an opening having a second area. The second area is larger than the first area. The cathode layer 14 is disposed on the emitter surface 86 and the sidewalls of the first and second sections of the emitter chamber 114.

Figure 11M:
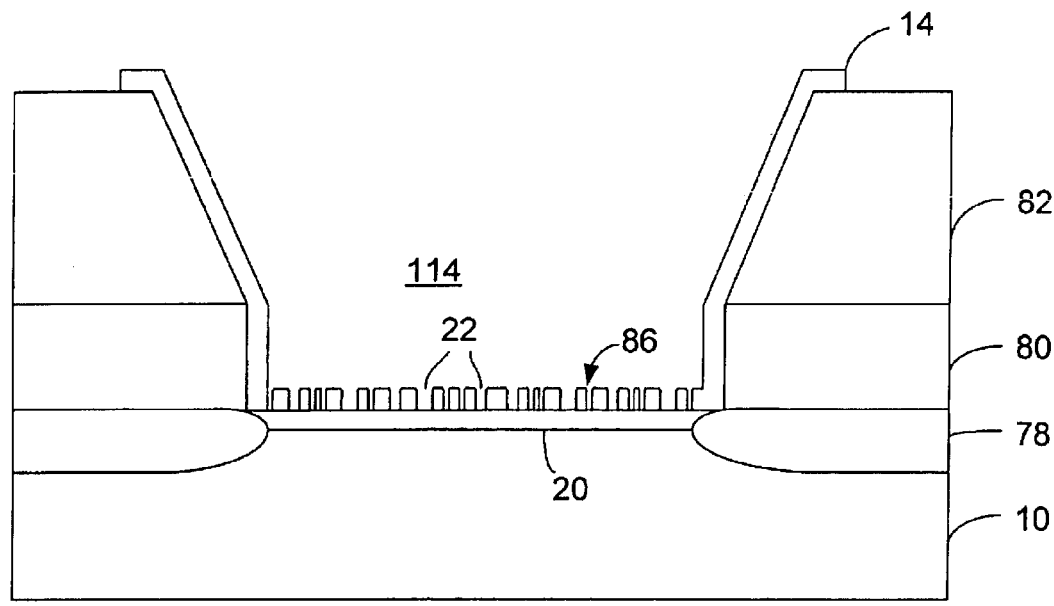

In FIG. 11M, after fabrication, the emitter is optionally subjected to an annealing process to increase the amount of emission from the emitter by creating nanohole-sized openings 22 and reducing the tunneling resistance in the tunneling dielectric layer 20. By using integrated circuit thin film technology to fabricate the emitter, it can be integrated along with traditional active circuits found on conventional integrated circuits. The integrated circuit with the emitter can be used in display devices or storage devices as previously described.

Figure 12A:
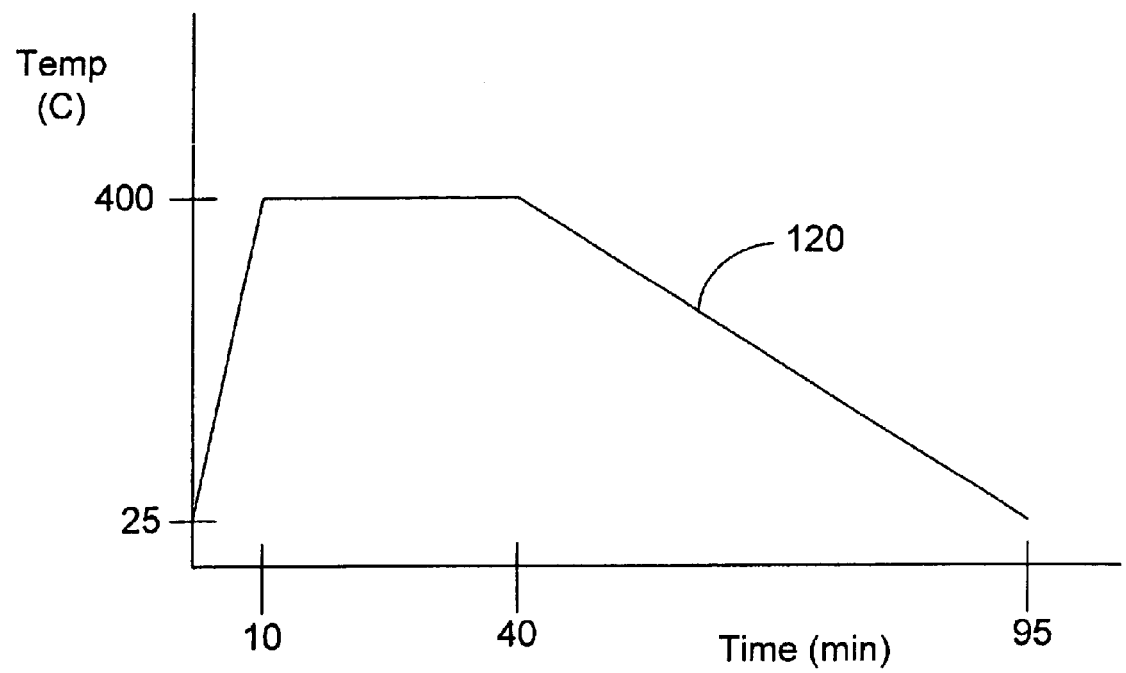
FIGS. 12A and 12B are charts of exemplary annealing processes used to optionally improve the tunneling emitter embodiments of the invention.
Figure 12B:
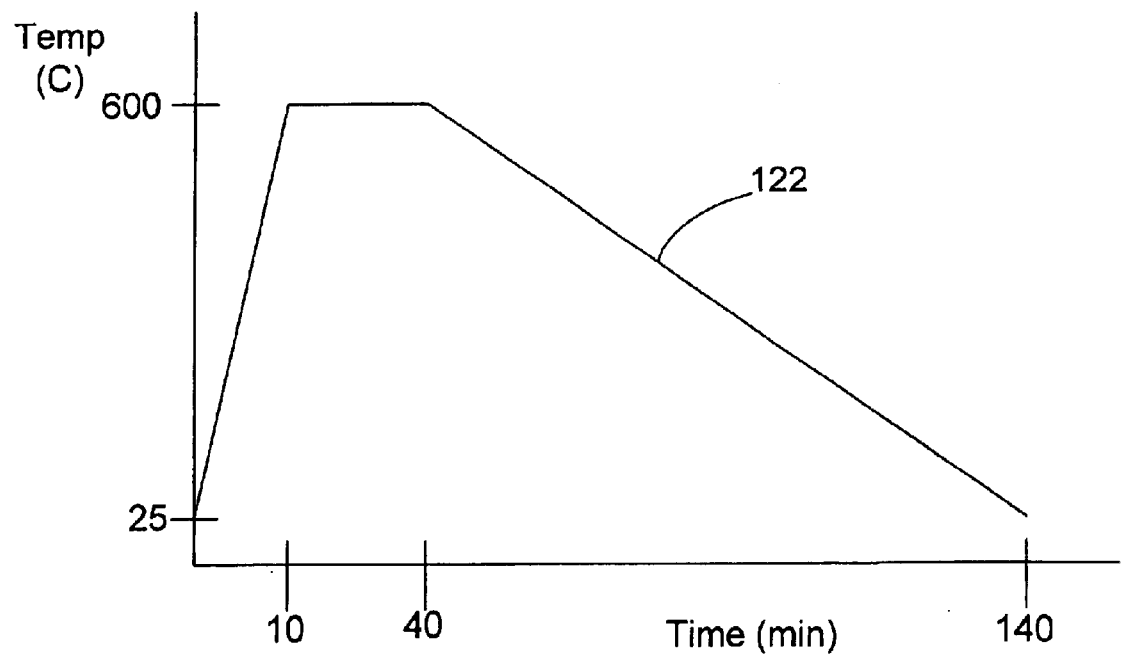

FIGS. 12A and 12B are charts of exemplary annealing processes which are used to increase the emission current capability of an emitter embodying the invention. An annealing process also increases the device yields and quality by allowing the emitters to last longer. The annealing process, among other benefits, helps to decrease the resistance of contacts of dissimilar metals thereby increasing the current flow to the emitters.

Preferably, to create nanoholes in platinum, the air environment in which the annealing process occurs should contain nitrogen gas. Air has about 78% nitrogen gas by composition and annealing within an air environment will create nanoholes. An optional environment is to use substantially an environment of nitrogen gas only. Experimental testing has shown that annealing platinum in oxygen only or argon only atmosphere environment will not create nanohole-sized openings. Preferably, the annealing process is performed in a rapid thermal process chamber with no vacuum rather than a tube furnace to speed up the process and to prevent any dopant from spreading throughout the processed wafer. For gold, the composition of the atmosphere does not appear to be important and annealing in a vacuum appears to work as well.

In FIG. 12A, a first thermal profile 120 shows the processed substrate that includes an emitter incorporating the invention first elevated to a temperature of about 400 C. within 10 minutes then held at this temperature for 20 to 30 minutes. Then the processed substrate is slowly cooled back to room temperature (about 25 C.) over a period of about 55 minutes.

In FIG. 12B, a second thermal profile 122 shows the processed substrate including an emitter incorporating the invention heated to a temperature of about 600 C. (or optionally another level such as 650 C.) within 10 minutes and held at that temperature for about 20 to 30 minutes. Then, the processed substrate is gradually cooled to room temperature over a period of about 100 minutes. Those skilled in the art will appreciate that the elevated temperature and the rate of cooling can be modified from the exemplary processes described and still meet the spirit and scope of the invention. By annealing the substrate that includes at least one emitter incorporating the invention, several characteristics of the emitter are improved, especially electron emission density.

For gold, depending on the thickness and adhesive layer used, the maximum annealing temperature can be lowered to about 175 degrees C. and still form nanohole openings.

Figure 13:
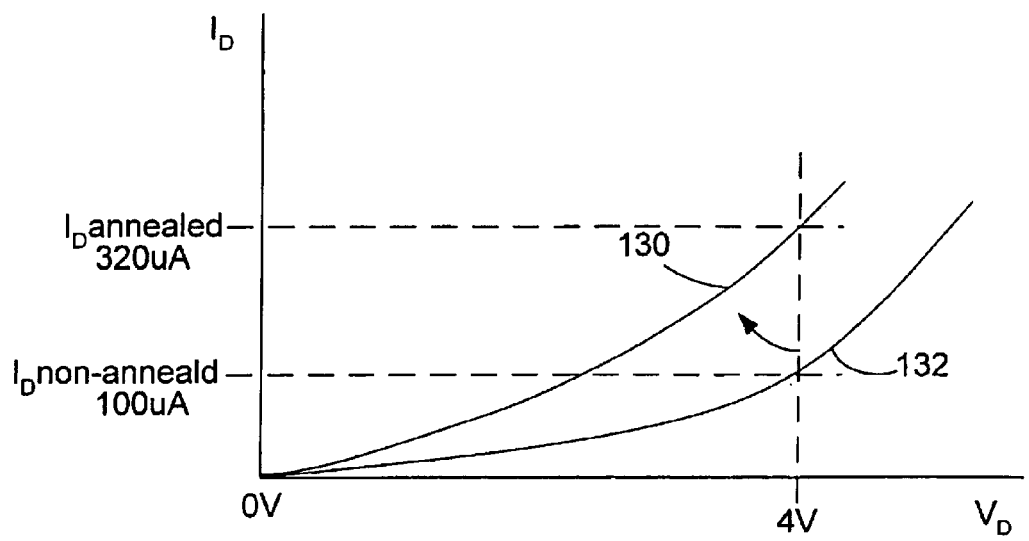
FIG. 13 is an exemplary graph showing a change in tunneling resistance due to the annealing process.

FIG. 13 is an exemplary chart showing the improvement in lower tunneling resistance attributed to the annealing process. In this example, non-annealed IV curve 132 represents the current $i_d$ measured through a non-annealed tunneling emitter 50 (see FIG. 2). The tunneling emitter 50 has a characteristic IV curve in the forward bias direction that appears exponential such as with a tunneling diode. A portion of the current through the tunneling emitter 50 is converted to the emitted current $i_e$ that leaves the emitter and collected by an anode 30 (see FIG. 2). In this empirical example, the current measured at 4 volts of applied voltage across the emitter is about 100 uA for a non-annealed emitter represented by non-annealed IV curve 132. Annealing the emitter 50 causes the tunneling current to increase by lowering the tunneling resistance as is shown by the annealed IV curve 130, which represents the annealed emitter characteristic IV curve when biased in the forward direction. In this example, the current $i_d$ measured with an applied voltage of about 4V is about 320 uA. This change in tunneling current is on the order of over three times that of the non-annealed emitter and thus corresponds to a tunneling resistance on the order of about three times less than the non-annealed emitter. Depending on the annealed process and parameters of the process used, it is desired that the tunneling resistance be decreased by at least an order of 2 or more which is possible as indicated by the empirical results of a test emitter shown here.

Figure 14:
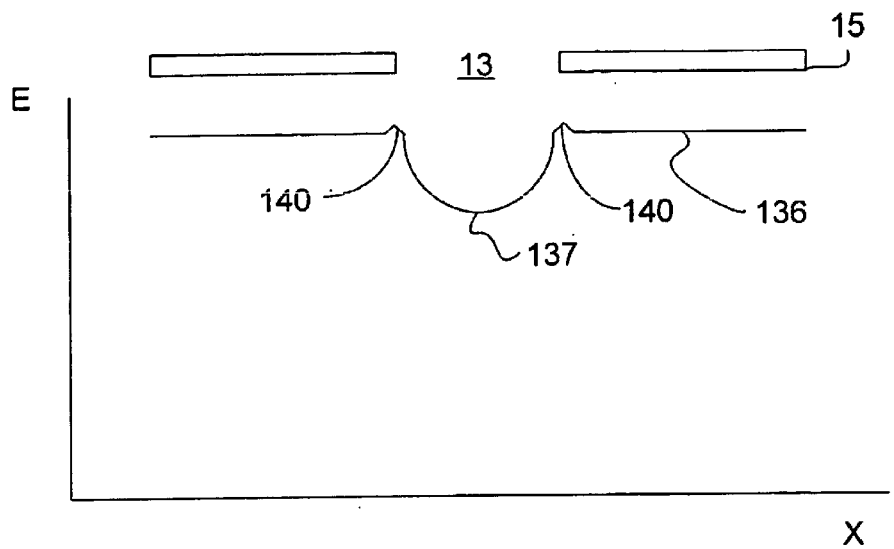
FIG. 14 is an exemplary graph of a cathode layer having an opening that is non-nano sized and its corresponding electric field across the surface of the emitter.

Although the nanohole-sized openings in the cathode surface of exemplary embodiments increase the emission current, these nanohole openings are limited in how large they can with respect to the emitter surface in order to be practical. FIG. 14 is an exemplary chart showing the electric field strength across the surface of an emitter that has larger than nano scale holes. In this instance an exemplary cathode layer 15 has a large opening 13 with respect to the cathode-emitting surface. As is shown on the plot 136 showing the electric field applied to the tunneling layer, there is a depression 137 that has a lower electric field in the region of the large opening 13. This reduction in the size of the electric field prevents many tunneled electrons from emitting through the large opening 13 and instead to emit into the cathode 15 surface that does not have openings. These electrons emitted into the cathode have more momentum than those emitted from the region within the large opening 13 and accordingly they may damage the surface of cathode 15 causing the emitter to eventually fail. Also shown are bumps 140 which show an enhanced electric field in the vicinity of the large opening 13. These bumps 140 are created due to the increased electric field around the edges of the large opening 13.

Figure 15:
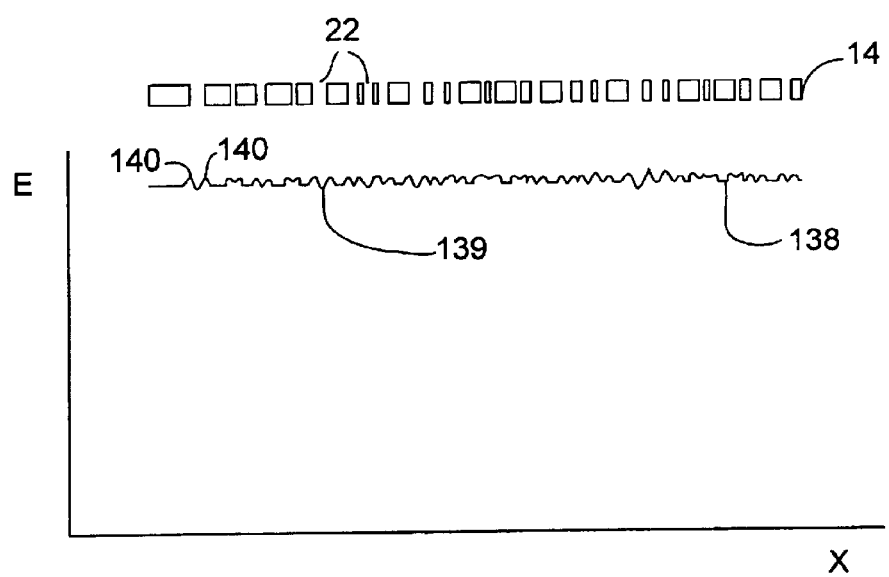
FIG. 15 is an exemplary graph of a cathode layer having nanohole-sized openings and its corresponding electric field across the surface of the emitter.

FIG. 15 is an exemplary chart showing the electric field across the surface of an emitter that has nanohole-sized openings 22. Because the nanohole-sized openings are small relative to the emitter surface of cathode 14, plot 138 shows only a slight variation 139 in the electric field strength over the surface of the tunneling layer. Bumps 140 increase the electric field in the vicinity of the edges of nanohole-sized openings 22. To prevent the electric field from creating a large depression such as depression 137 in FIG. 14, preferably the width or narrowest opening of the nanohole-sized openings 22 is less than 10% of the thickness of the tunneling layer and more preferably less than 5% of the thickness of the tunneling layer.

Also important is the amount of porosity of the cathode layer. The porosity is the ratio of the total area of the openings to the total area of the cathode layer. Generally, the more porosity, the higher the emissions measured from the emitter. However, the narrowest opening must be small enough to maintain the electric field strength over the surface of the cathode layer. For example, the porosity should be greater than 25% and preferably at least 12.5%. However, generally as the size of the narrowest opening of the nanoholes increases, the maximum porosity to obtain maximum emissions will decrease. As the size of the narrowest opening of the nanoholes decreases, the maximum porosity to obtain maximum emissions will increase. As an example from empirical testing, a gold cathode layer of 75 Angstroms having cracks with a narrow openings of 7 nm and a porosity of 13% had over 6 times the emissions of a gold/Ta cathode layer of 30 Angstroms of Gold/15 Angstroms of Ta with 15 nm narrow openings and a porosity of 25%.

Figure 16A:
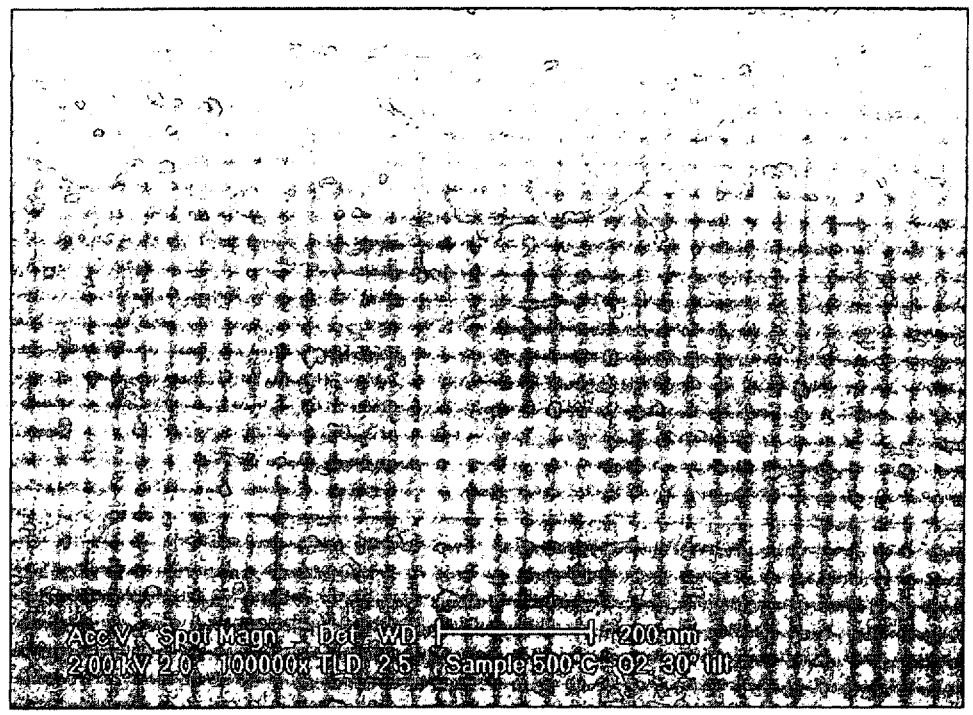
FIG. 16A is a photo of an SEM blowup of the surface of a platinum cathode layer which has been annealed in an oxygen only environment.

FIG. 16A is an exemplary scanning electron microscope magnification (10,000×) of an experimentally produced electron emitter having a platinum cathode surface that was annealed at 500 C. in an oxygen only environment. No nanoholes were observed as being formed.

Figure 16B:
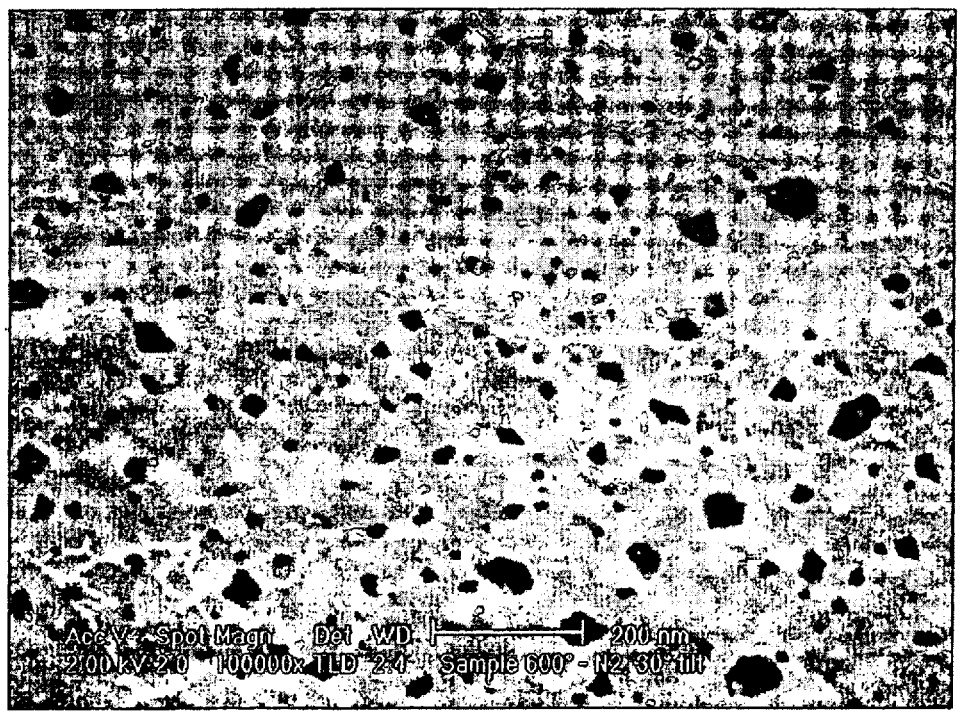
FIG. 16B is a photo of an SEM blowup of the surface of a platinum cathode layer which has been annealed in a nitrogen only environment.
Figure 17:
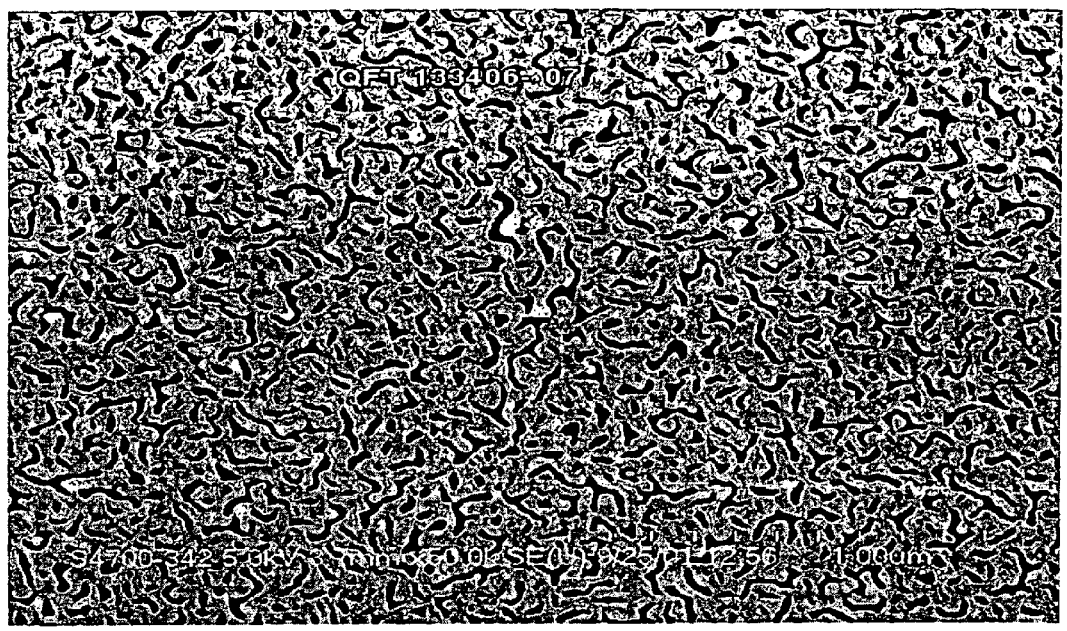
FIG. 17 is a photo of an SEM blowup of the surface of a gold cathode layer which has been subjected to an annealing process.

FIG. 16B is an exemplary scanning electron microscope magnification (10,00×) of an experimentally produced electron emitter having a platinum cathode surface that was annealed at 600 C. in a nitrogen only environment. As can be seen, the nanoholes created are substantially uniformly distributed on average but vary in size and spacing. The nanoholes appear to be on the order of about roughly 10 to 100 nanometers in diameter, although the shapes of the nanoholes are not truly circular but irregularly shaped.

FIG. 16B is an exemplary scanning electron microscope magnification of a gold cathode layer having a thickness of about 75 angstroms. Note that while the nanoholes are non-circular, the nanoholes are still substantially uniformly distributed across the surface of the emitter and allow the cathode layer to maintain contiguous electrical contact across the surface of the emitter. The nanoholes in this example are randomly shaped and randomly but uniformly distanced from each other on average.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. An emitter, comprising:
   an electron supply;
   a porous cathode layer having nanohole openings; and
   a tunneling layer disposed between the electron supply and the cathode layer.

2. The emitter of claim 1 wherein the nanohole openings were formed in an annealing process of the emitter.

3. The emitter of claim 2 wherein the annealing process is performed in an environment containing nitrogen.

4. The emitter of claim 2 wherein the annealing process subjects the emitter to a temperature between about 400 and about 650 degrees C. for about 20 to about 30 minutes.

5. The emitter of claim 2 wherein the annealing process decreases the tunneling resistance of the tunneling layer by at least a factor of 2.

6. The emitter of claim 1 wherein the tunneling layer is at least one of a metal cluster dielectric, a rapid thermal process grown silicon dioxide, polysilicon, silicon oxide, silicon nitride, silicon oxynitrides or silicon carbide.

7. The emitter of claim 1 wherein the tunneling layer is deposited on or includes a ballast layer.

8. The emitter of claim 1 wherein the porous cathode layer is selected from the group consisting of platinum, gold, and gold and tantalum.

9. The emitter of claim 1 operable to provide an emission current of greater than $1 \times 10^{-2}$ Amps per square centimeter.

10. The emitter of claim 1 operable to provide an emission current of greater than 1 Amp per square centimeter.

11. The emitter of claim 1 operable to provide an emission efficiency of greater than 1%.

12. The emitter of claim 1 wherein the tunneling layer has a thickness less than about 500 Angstroms.

13. The emitter of claim 1 wherein the narrowest dimension of the nanohole openings are on the order of between 1 and 10 nanometers.

14. The emitter of claim 1 wherein the longest dimension of the nanohole openings are on the order of between 10 and 100 nanometers.

15. The emitter of claim 1 wherein the nanohole openings are uniformly distributed on average but randomly spaced across the surface of the cathode layer.

16. The emitter of claim 1 wherein the porous cathode layer has a porosity of more than 12.5%.

17. An integrated circuit, comprising:
   a substrate;
   the emitter of claim 1 disposed on the substrate; and
   circuitry for operating the emitter formed on the substrate with the emitter.

18. An electronic device, comprising:
   the emitter of claim 1 capable of emitting energy; and
   an anode structure capable of receiving the emitting energy and generating at least a first effect in response to receiving the emitted energy and a second effect in response to not receiving the emitted energy.

19. The electronic device of claim 18 wherein the electronic device is a mass storage device and the anode structure is a storage medium, the electronic device further comprising a reading circuit for detecting the effect generated on the anode structure.

20. The electronic device of claim 18 wherein the electronic device is a display device and the anode structure is a display screen that creates a visible effect in response to receiving the emitted energy.

21. The electronic device of claim 20 wherein the display screen includes one or more phosphors operable for emitting photons in response to receiving the emitted energy.

22. A storage device, comprising:
at least one emitter to generate an electron beam current, wherein the at least one emitter has a cathode emission surface having nanohole openings;
a lens for focusing the electron beam current to create a focused beam; and
a storage medium in close proximity to the at least one emitter, the storage medium having a storage area being in one of a plurality of states to represent the information stored in that storage area;
such that:
an effect is generated when the focused beam strikes the storage area;
the magnitude of the effect depends on the state of the storage area; and
the information stored in the storage area is read by measuring the magnitude of the effect.

23. The storage device of claim 22 wherein the effect is a signal current.

24. The storage device of claim 22 wherein the emitter has been subjected to an annealing process in a environment containing nitrogen.

25. An emitter, comprising:
an electron supply layer;
an insulator layer formed on the electron supply layer and having an opening defined within;
a tunneling layer formed over the electron supply layer in the opening; and
a cathode layer formed on the tunneling layer having nanohole openings;
wherein the emitter has been subjected to an annealing process to increase the supply of electrons tunneled from the electron supply layer to the cathode layer for energy emission.

26. The emitter of claim 25 wherein the tunneling layer tunneling resistance has been decreased by at least an order of 2 by the annealing process.

27. The emitter of claim 25 wherein the emitter has an electron emission density greater than about 0.01 Amps per square centimeter.

28. The emitter of claim 25 wherein the narrowest dimension of the nanohole openings in the cathode layer are on the order of about 1 to about 10 nanometers.

29. The emitter of claim 25 wherein the longest dimension of the nanohole openings in the cathode layer are on the order of about 10 to about 100 nanometers.

30. A storage device, comprising:
an integrated circuit including the emitter of claim 25 wherein the emitter creates an electron beam current; and
a storage medium in close proximity to the emitter, the storage medium having a storage area being in one of a plurality of states to represent the information stored in that storage area;
such that:
an effect is generated when the electron beam current strikes the storage area;
the magnitude of the effect depends on the state of the storage area; and
the information stored in the storage area is read by measuring the magnitude of the effect.

31. An electronic device, comprising:
an integrated circuit including the emitter of claim 25; and
a focusing device for converging the emissions from the emitter.

32. A computer system, comprising:
a microprocessor;
the electronic device of claim 31 coupled to the microprocessor; and
memory coupled to the microprocessor, the microprocessor operable of executing instructions from the memory to transfer data between the memory and the electronic device.

33. The computer system of claim 32 wherein the electronic device is a storage device.

34. The computer system of claim 32 wherein the electronic device is a display device.

35. An emitter, comprising:
an electron supply surface;
an insulator layer formed on the electron supply surface and having a first opening defined within;
an adhesion layer disposed on the insulator layer, the adhesion layer defining a second opening aligned with the first opening;
a conductive layer disposed on adhesion layer and defining a third opening aligned with the first and second openings;
a tunneling layer formed over the electron supply layer within the first, second, and third openings; and
a cathode layer disposed on the tunneling layer and portions of the conductive layer, wherein the portion of the cathode layer on the tunneling layer has nanohole-sized openings providing electron emission sites.

36. The emitter of claim 35 wherein the electron emitting surface has an emission rate of at least 0.1 Amps per square centimeter.

37. The emitter of claim 35, wherein the narrowest dimension of the nanohole-sized openings in the cathode layer are on the order of about 1 to about 10 nanometers.

38. The emitter of claim 35, wherein the longest dimension of the nanohole-sized openings in the cathode layer are on the order of about 10 to about 100 nanometers.

39. The emitter of claim 35, wherein the nanohole-sized openings in the cathode layer are on the order of less than 10% the thickness of the tunneling layer.

40. The emitter of claim 34 wherein the nanohole-sized openings in the cathode layer are uniformly on average but randomly spaced over the surface of the cathode emission surface.

41. An emitter, comprising:
an emitting surface having a first area, the emitter surface having cathode surface with nanohole-sized emission site openings;
a first chamber having substantially parallel sidewalls interfacing to the emitting surface; and
a second chamber interfacing to the first chamber and having sidewalls diverging to an opening having a second area larger than the first area.

42. The emitter of claim 41, wherein the cathode layer is disposed on the emitting surface, and sidewalls of the first and second chambers and wherein the emitter has been subjected to an annealing process in a nitrogen containing environment thereby increasing the emission capability of the emitter.

43. The emitter of claim 41 wherein the first chamber is formed within an adhesion layer.

44. The emitter of claim 41 wherein the second chamber is formed within a conductive layer.

45. An integrated circuit comprising at least one emitter of claim 41.

46. A display device comprising at least one emitter of claim 41.

47. A storage device comprising at least one emitter of claim 41.

48. An integrated circuit, comprising:

a conductive surface to provide an electron supply;

at least one emitter formed on the electron supply including, an insulator layer having at least one opening to define the location and shape of the at least one flat emitter device, a conductive layer disposed over the insulator layer, the conductive layer having at least one opening in alignment with the at least one opening;

a tunneling layer disposed within the at least one opening of the insulator layer; and a cathode layer disposed partially over the conductive layer and over the tunneling layer, wherein at least the portion of the cathode layer over the tunneling layer has nanohole-sized openings.

49. The integrated circuit of claim 48 wherein the integrated circuit has been subjected to an annealing process having a nitrogen environment.

50. The integrated circuit of claim 28 wherein the integrated circuit has been subjected to an annealing process that ramps to an maintains a temperature of at least about 400 to about 650 degrees C. for about 20 to 30 minutes before cooling.

51. The integrated circuit of claim 48 wherein the tunneling layer is at least one of a metal cluster, a rapid thermal process grown silicon dioxide, a polysilicon, a silicon oxide, a silicon oxynitride, a silicon nitride, or a silicon carbide dielectric.

52. The integrated circuit of claim 48 wherein the tunneling layer has a thickness less than about 500 Angstroms.

53. The integrated circuit of claim 48 wherein the tunneling layer is $TiO_x$, wherein x=0.5 to 2.5.

54. The integrated circuit of claim 48 wherein the nanohole-sized openings are less than about 500 nanometers and randomly spread over the tunneling layer.

* * * * *

UNITED STATES PATENT AND TRADEMARK OFFICE
CERTIFICATE OF CORRECTION

PATENT NO. : 6,911,768 B2
DATED : June 28, 2005
INVENTOR(S) : Chen et al.

It is certified that error appears in the above-identified patent and that said Letters Patent is hereby corrected as shown below:

<u>Column 18,</u>
Line 10, delete "an" and insert -- and --.

Signed and Sealed this

Third Day of January, 2006

JON W. DUDAS
*Director of the United States Patent and Trademark Office*